US012684393B2

(12) United States Patent
Bhorkar et al.

(10) Patent No.: US 12,684,393 B2
(45) Date of Patent: *Jul. 14, 2026

(54) CHANNEL STATE INFORMATION (CSI) MEASUREMENTS AND CSI REPORTING IN LICENSED ASSISTED ACCESS (LAA)

(71) Applicant: Apple Inc., Cupertino, CA (US)

(72) Inventors: Abhijeet Bhorkar, Fremont, CA (US); Hwan-Joon Kwon, Santa Clara, CA (US); Jeongho Jeon, San Jose, CA (US); Qiaoyang Ye, Fremont, CA (US)

(73) Assignee: Apple Inc., Cupertino, CA (US)

( * ) Notice: Subject to any disclaimer, the term of this patent is extended or adjusted under 35 U.S.C. 154(b) by 469 days.

This patent is subject to a terminal disclaimer.

(21) Appl. No.: 18/340,957

(22) Filed: Jun. 26, 2023

(65) Prior Publication Data

US 2023/0354079 A1 Nov. 2, 2023

Related U.S. Application Data

(63) Continuation of application No. 17/733,057, filed on Apr. 29, 2022, now Pat. No. 11,751,088, which is a (Continued)

(51) Int. Cl.
H04W 24/10 (2009.01)
H04B 7/0456 (2017.01)
(Continued)

(52) U.S. Cl.
CPC .......... *H04W 24/10* (2013.01); *H04B 7/0456* (2013.01); *H04B 7/0626* (2013.01);
(Continued)

(58) Field of Classification Search
None
See application file for complete search history.

(56) References Cited

U.S. PATENT DOCUMENTS

2014/0133447 A1 5/2014 Moulsley et al.
2014/0241289 A1 8/2014 Khan
(Continued)

FOREIGN PATENT DOCUMENTS

EP 2770770 A1 8/2014
WO 2013/060863 A1 5/2013

OTHER PUBLICATIONS

International Search Report Dated Nov. 14, 2016 for International Application PCT/US2016/048145.
(Continued)

*Primary Examiner* — Christine T Duong
(74) *Attorney, Agent, or Firm* — Eschweiler & Potashnik, LLC; Ningjiao Zhang

(57) ABSTRACT

Techniques for channel state information (CSI) reporting are discussed. One example apparatus at a user equipment can derive, for one or more subframes of a license assisted access (LAA) secondary cell (SCell), one or more channel measurements based on reference signals (e.g., cell-specific reference signals (CRS) or CSI reference signals (CSI-RS)), in those subframes; generate CSI that comprises a channel quality indicator (CQI) based on an average of the one or more channel measurements from multiple subframes comprising a first subframe and a later second subframe, wherein each orthogonal frequency division multiplexing (OFDM) symbol of a second slot of the first subframe is occupied, wherein each of a first three OFDM symbols of the second subframe are occupied, and wherein each OFDM symbol between the first subframe and the second subframe is occupied; and generate a CSI report that indicates the set of CSI parameters.

20 Claims, 13 Drawing Sheets

Subframe containing CSI-RS  CSI report on PCell  UL grant

Related U.S. Application Data continuation of application No. 16/994,965, filed on Aug. 17, 2020, now Pat. No. 11,337,098, which is a continuation of application No. 15/767,861, filed as application No. PCT/US2016/048145 on Aug. 23, 2016, now Pat. No. 10,750,394.

(60) Provisional application No. 62/252,365, filed on Nov. 6, 2015.

(51) Int. Cl.

| | |
|---|---|
| *H04B 7/06* | (2006.01) |
| *H04L 1/00* | (2006.01) |
| *H04L 5/00* | (2006.01) |
| *H04L 27/00* | (2006.01) |

(52) U.S. Cl.
CPC .......... *H04B 7/063* (2013.01); *H04B 7/0632* (2013.01); *H04L 1/0004* (2013.01); *H04L 5/001* (2013.01); *H04L 5/0048* (2013.01); *H04L 5/0057* (2013.01); *H04L 5/0091* (2013.01); *H04L 27/0006* (2013.01)

(56) References Cited

U.S. PATENT DOCUMENTS

| | | | |
|---|---|---|---|
| 2015/0215929 A1 | 7/2015 | Damnjanovic et al. | |
| 2016/0270091 A1* | 9/2016 | Frenne | .................. H04L 1/0026 |
| 2017/0171781 A1* | 6/2017 | Seo | ....................... H04J 11/005 |
| 2018/0279144 A1 | 9/2018 | Mulcherjee et al. | |

OTHER PUBLICATIONS

"Transmission schemes and CSI support for LAA." Source: Huawei, HiSilicon. Agenda item: 6.2.4.3. 3GPP TSG RAN WG1 81 Meeting, Fukuoka, Japan, May 25-29, 2015. R-152473. 4 pages.

"3rd Generation Partnership Project; Technical Specification Group Radio Access Network; Evolved Universal Terrestrial Radio Access (E-UTRA); Physical layer procedures (Release 13)." 3GPP TS 36.213 V13.2.0 (Jun. 2016). 3GPP Lte Advanced Pro. pp. 1-6.

"3rd Generation Partnership Project; Technical Specification Group Radio Access Network; Evolved Universal Terrestrial Radio Access (E-UTRA); Physical layer procedures (Release 13)." 3GPP TS 36.213 V13.2.0 (Jun. 2016). 3GPP Lte Advanced Pro. pp. 7-44.

"3rd Generation Partnership Project; Technical Specification Group Radio Access Network; Evolved Universal Terrestrial Radio Access (E-UTRA); Physical layer procedures (Release 13)." 3GPP TS 36.213 V13.2.0 (Jun. 2016). 3GPP Lte Advanced Pro. pp. 45-254.

"3rd Generation Partnership Project; Technical Specification Group Radio Access Network; Evolved Universal Terrestrial Radio Access (E-UTRA); Physical layer procedures (Release 13)." 3GPP TS 36.213 V13.2.0 (Jun. 2016). 3GPP Lte Advanced Pro. pp. 255-334.

"3rd Generation Partnership Project; Technical Specification Group Radio Access Network; Evolved Universal Terrestrial Radio Access (E-UTRA); Physical layer procedures (Release 13)." 3GPP TS 36.213 V13.2.0 (Jun. 2016). 3GPP Lte Advanced Pro. pp. 335-370.

"3rd Generation Partnership Project; Technical Specification Group Radio Access Network; Evolved Universal Terrestrial Radio Access (E-UTRA); Physical layer procedures (Release 13)." 3GPP TS 36.213 V13.2.0 (Jun. 2016). 3GPP Lte Advanced Pro. pp. 371-381.

"LTE; Evolved Universal Terrestrial Radio Access (E-UTRA); Physical channels and modulation (3GPP TS 36.211 version 13.1.0 Release 13)." ETSI TS 136 211 V13.1.0 (Apr. 2016). 3GPP LTE Advanced Pro. 157 pages.

"LTE; Evolved Universal Terrestrial Radio Access (E-UTRA); Multiplexing and channel coding (3GPP TS 36.212 version 13.1.0 Release 13)." ETSI TS 136 212 V13.1.0 (Apr. 2016). 3GPP Lte Advanced Pro. 130 pages.

Notice of Allowance dated Apr. 14, 2020 for U.S. Appl. No. 15/767,861.

Non-Final Office Action dated Oct. 24, 2019 for U.S. Appl. No. 15/767,861.

Non-Final Office Action dated Sep. 10, 2021 for U.S. Appl. No. 16/994,965.

Notice of Allowance dated Jan. 13, 2022 for U.S. Appl. No. 16/994,965.

EP Extended Search Report Dated Oct. 31, 2022 for International Application 22189627.7.

Notice of Allowance dated Apr. 17, 2023 for U.S. Appl. No. 17/733,057.

* cited by examiner

Example UE

1200

1210 — DEMODULATE DL TRANSMISSIONS COMPRISING SUBFRAME(S) WITH CRS/CSI-RS FOR CSI MEASUREMENT AND TX POWER

1220 — MEASURE CRS/CSI-RS FOR SUBFRAME(S)

1230 — SCALE MEASURED CRS/CSI-RS BASED ON TRANSMIT POWER OF ASSOCIATED DL TRANSMISSION

1240 — DETERMINE CQI FOR UNLICENSED SUBCARRIER BASED ON AVERAGE OF ONE OR MORE SCALED MEASUREMENTS

1250 — GENERATE CSI REPORT THAT INDICATES CQI

1300

1310 — PERFORM CLEAR CHANNEL ASSESSMENT ON ONE OR MORE UNLICENSED SUBCARRIERS

1320 — GENERATE DL TRANSMISSION FOR AVAILABLE SUBCARRIER(S) OF ONE OR MORE UNLICENSED SUBCARRIERS

1330 — SCHEDULE CRS/CSI-RS IN ONE OR MORE SUBFRAMES OF DL TRANSMISSION

1340 — ASSIGN TRANSMIT POWER FOR CRS/CSI-RS

1350 — RECEIVE CSI REPORT

CHANNEL STATE INFORMATION (CSI) MEASUREMENTS AND CSI REPORTING IN LICENSED ASSISTED ACCESS (LAA)

REFERENCE TO RELATED APPLICATIONS

This application is a continuation of U.S. application Ser. No. 17/733,057 filed on Apr. 29, 2022, which is a continuation of U.S. application Ser. No. 16/994,965 filed on Aug. 17, 2020 (now U.S. Pat. No. 11,337,098, issued on May 17, 2022), which is a continuation of U.S. application Ser. No. 15/767,861 filed on Apr. 12, 2018 (now U.S. Pat. No. 10,750,394, issued on Aug. 18, 2020), which is a National Phase Entry of International Application Number PCT/US2016/048145 filed on Aug. 23, 2016, which claims the benefit of U.S. Provisional Application No. 62/252,365 filed Nov. 6, 2015, entitled "CSI MEASUREMENTS AND CSI REPORTING IN LAA", the contents of which are herein incorporated by reference in their entirety.

FIELD

The present disclosure relates to wireless technology, and more specifically to techniques for measuring and reporting channel state information (CSI) in license assisted access (LAA).

BACKGROUND

In LTE (Long Term Evolution) systems, a user equipment (UE) measures channel state information (CSI) based on either cell-specific reference signals (CRS) or CSI reference signals (CSI-RS) and transmits a CSI report to an eNB to indicate the measured CSI.

DETAILED DESCRIPTION

Figure 1:
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

Additionally, although the above example discussion of device 100 is in the context of a UE device, in various aspects, a similar device can be employed in connection with a base station (BS) such as an Evolved NodeB (eNB), etc.

In long term evolution (LTE), cell specific reference signals (CRS) are used for channel state information (CSI) measurement (e.g., channel quality information (COI), precoding matrix indicator (PMI), and/or rank indication (RI)) and demodulation of transmission modes (TM) 1-TM 7, while CRS is only used for CSI measurement in TM8. CSI-RS (CSI reference signals), a cell specific sparse sequence (in frequency and time domain compared to CRS) is used in transmission modes TM 9 and TM 10 for CSI measurements. For TM 8, TM 9 and TM 10, user equipment (UE) specific demodulation reference signal (DMRS) is used for physical downlink shared channel (PDSCH) demodulation.

Channel state information reference signals (CSI-RS) are used to acquire CSI at the UEs configured with TM 9 and TM 10. The structure of the CSI-RS is indicated to UE by specifying CSI-RS configuration defining up to eight different CSI-RS ports for one CSI-RS process. A CSI-RS configuration is a UE specific configuration specifying the number of CSI-RS ports (one, two, four, or eight), the CSI-RS periodicity (5 millisecond (ms), 10 ms, 20 ms, 40 ms, or 80 ms are specified in LTE Release 12), the CSI-RS subframe offset within the CSI-RS period and the exact CSI-RS locations within a resource-block pair. There are 20, 10, and 5 different configurations for one/two, four, and eight CSI-RS ports, respectively, potentially occurring in a subframe at OFDM symbols 5, 6, 9, 10, 12 or 13 in type 0 frame format. Up to 3 CSI-RS processes can be configured at the UE for CSI measurements. In addition to these Non Zero Power (NZP) CSI-RS, in TM 9 and TM 10, UEs may be configured with Zero Power (ZP) CSI-RS resources and UEs use the ZP CSI-RS for the CSI measurements on other cells. With ZP CSI-RS indication, a UE may correctly perform rate matching and mapping of PDSCH/enhanced physical downlink control channel (EPDCCH) resources for demodulating the corresponding transport blocks. For TM10, channel state information interference measurement (CSI-IM) resources can be similarly configured at the UE for performing interference measurements on the indicated resource elements (Res) by CSI-IM configuration.

Based on the reception of CRS/CSI-RS, LTE Release 12 supports (i) periodic reporting wherein the UE reports CSI periodically on preconfigured physical uplink control channel (PUCCH)/physical uplink shared channel (PUSCH) resources with periods configured by the higher layers; (ii) aperiodic reporting wherein, the CSI report is triggered using downlink control indication (DCI) by dynamically assigning uplink (UL) resources in the PUSCH transmission.

In LTE, CRS can be transmitted within DRS (discovery reference signals) for radio resource management (RRM) measurements such as references signal received power (RSRP) and reference signal received quality (RSRQ), in addition to the CSI measurements. The CRS antenna ports that are used for RRM (radio resource management) measurements are typically done on antenna port 0, which may be different than those used for CSI measurements. Similarly, CSI-RS may be configured within a DRS occasion for performing RSRP measurements (e.g., for TM 10 scenario 4). The UE can be explicitly configured with the CSI-RS resources within DRS used for RSRP measurements.

Licensed Assisted Access (LAA) is a new technology considered in LTE Release 13 to meet the ever increasing demand for high data rate in wireless cellular networks by utilizing the carrier aggregation feature supported in LTE-A (LTE Advanced) to combine the data transmission over licensed primary carrier and unlicensed secondary component carriers. The 5 GHz band is of current interest in 3GPP (the Third Generation Partnership Project). For fair coexistence with the incumbent systems at the 5 GHz band, such as the IEEE (Institute of Electrical and Electronics Engineers) 802.11 standard based wireless local area networks (WLAN), Listen-Before-Talk (LBT) is considered as a feature of Release 13 LAA system. According to agreements in RAN1 (Radio Access Network Working Group 1)-82bis, CRS based transmission modes including TM1, TM2, TM3, TM4, TM8 and CSI-RS based transmission modes including TM9, TM10 are supported on LAA SCell from RAN1 specification point of views. Various aspects discussed herein relate to the design impact of LBT on CRS/CSI-RS transmission and CSI reports.

Various aspects discussed herein facilitate measurement and reporting of channel state information (CSI) in connection with at least one license assisted access (LAA) secondary cell (SCell). In conventional LTE, CSI can be measured from CRS or CSI-RS transmitted at a known fixed power on licensed carriers. In LAA scenarios, however, the transmit power of CRS/CSI-RS may vary between LAA burst transmissions, and conventional techniques can lead to reporting inaccurate CSI measurements. In various aspects, techniques discussed herein can be employed to accurately measure and report CSI in connection with LAA SCells.

Various embodiments and techniques discussed herein relate to the design impact of LBT on CRS/CSI-RS transmission and CSI reports. A first set of embodiments discussed herein relate to details associated with CRS and/or CSI-RS transmission for LAA.

In some aspects associated with the first set of embodiments, CRS can be transmitted within a DRS burst. In one example scenario, the same CRS antenna ports can be transmitted in DRS as those transmitted in a DL (downlink) burst.

In additional aspects associated with the first set of embodiments, one or more of NZP CSI-RS, ZP CSI-RS, or CSI-IM can be transmitted within a DL burst and/or outside the DL burst. As an example, periodic and/or aperiodic CSI-RS can be transmitted within a DL burst or outside the DL burst.

In further aspects associated with the first set of embodiments, when a UE is configured with DRS and CSI-RS/NZP CSI-RS/CSI-IM in the same subframe for the purpose of CSI measurement using the configured CSI-RS, the situation can be addressed in multiple ways. In some embodiments, the same CRI-RS antenna ports as used in DL burst can be used in DRS. In other embodiments, different CRI-RS antenna ports can be used in DRS than those used in the DL burst. In various scenarios of these other embodiments, (i) only CSI-RS configuration for CSI measurements can be transmitted; (ii) only CSI-RS configuration for DRS can be transmitted; or (iii) both CSI-RS configurations for CSI measurement and CSI-RS configuration in DRS can be transmitted.

A second set of embodiments discussed herein relate to details associated with the UE behavior for periodic and/or aperiodic CSI reporting.

In scenarios in which the CRS and/or CSI-RS power is not explicitly indicated to a UE, the UE can use only the subframes within the same DL burst to compute the CSI. For the purposes of CSI reporting, the UE can report the latest CSI computation based on the subframes received within the latest burst until the transmission instant of the CSI report.

In scenarios in which the CRS and/or CSI-RS power is explicitly indicated to a UE, the UE can appropriately scale the CSI. For example, the UE can scale the computed CSI by taking into account the indicated transmit power(s) over DL bursts to obtain an equivalent CSI. After computing the equivalent CSI, the UE can select the set of subframes to be used for equivalent CSI computation and averaging. If a UE is not capable of scaling the CSI appropriately, the UE can perform CSI computation as in the scenarios wherein CSR/CSI-RS power is not indicated to the UE.

For multiple component carriers (CCs), a UE can explicitly indicate the subframe to be used for CSI computation. It is possible that the UE can receive CSI report request at the subframe for the CCs over which simultaneous CSI-RS transmission is not scheduled. In this case, the UE may indicate the latest computed CSI for the SCell, over which the UL grant for the CSI request is not transmitted. It is also possible to use an independent CSI process for each component carrier to resolve the issue that simultaneous CSI-RS transmission may not be possible across the component carriers.

Transmission of CRS and/or CSI-RS

In embodiments related to CRS transmission for LAA, the DRS occasion duration can be 12 symbols based on the existing Release-12 DRS. The DRS burst has sufficient resources to transmit CRS in symbols 0, 4, 7, and 11 for ports 0/1 and symbols 1 and 8 for ports 2/3. A UE can use CRS within the DRS for the purposes of CSI measurements. The CSI measurement using CRS within the DRS is possible if the CRS is transmitted on the same antenna ports in DRS and DL burst. For the purposes of RRM measurement, a UE can be configured to monitor different CRS ports (e.g., port 0 or ports 0/1) than transmitted CRS ports within DRS. In various aspects discussed herein, CRS can be transmitted on the same antenna ports in DRS as in the DL burst.

In embodiments related to CSI-RS transmission for LAA, transmission of NZP CSI-RS (within a DL burst or DRS) and ZP CSI-RS/CSI-IM (within DL burst) can be subject to LBT conditions. Potential transmission of subframes containing NZP CSI-RS/CSI-IM can be periodic or aperiodic from a UE perspective.

For periodic configurations, a UE can be configured to receive NZP CSI-RS/ZP CSI-RS/CSI-IM at periodic occasions. As the NZP CSI-RS/ZP CSI-RS/CSI-IM transmissions are subject to LBT, in various aspects, NZP CSI-RS/CSI-IM can be received within each data burst. Given the maximum channel occupancy time (MCOT) for compliance with LBT (e.g., 4 ms in Japan), there can be up to 4 normal subframes present within a DL burst. Thus, in aspects, the period of NZP CSI-RS/ZP CSI-RS/CSI-IM configurations can be reduced to be smaller than the current minimum of 5 ms as defined in Release 12, which can increase the chance that a DL burst includes NZP CSI-RS/ZP CSI-RS/CSI-IM. As examples, CSI-RS/ZP CSI-RS/CSI-IM can be configured with a potential period of 2 ms or 3 ms to ensure the presence in every DL burst of duration 4 ms.

Figure 2:
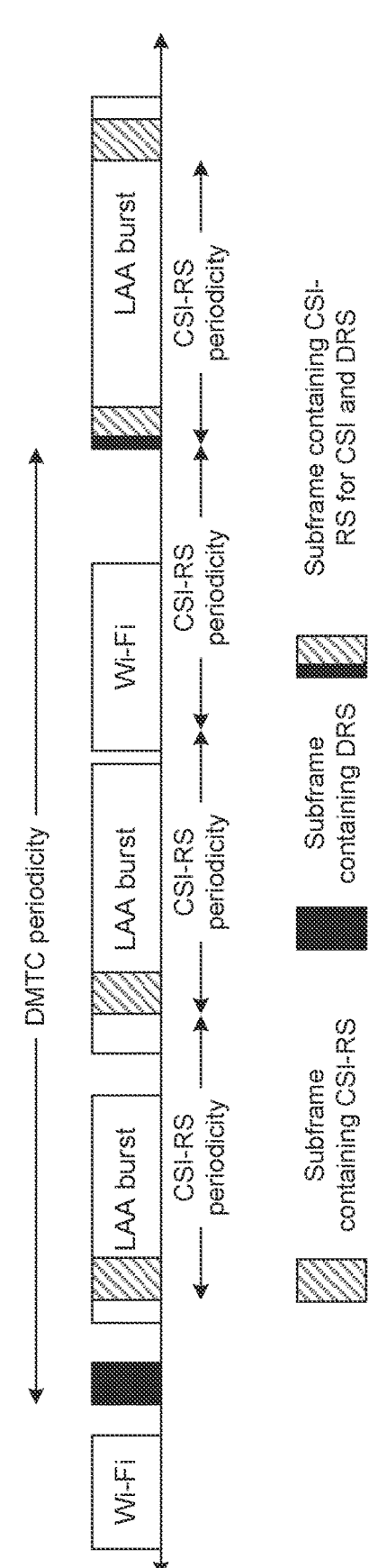
FIG. 2 is an example scenario involving a periodic CSI-RS transmission for CSI computation within a DL burst, according to various aspects described herein.
Figure 2:

In order to detect the presence of periodic CSI-RS, a UE can detect the presence of a subframe containing CSI-RS/NP CSI-RS/CSI-IM within a DL burst, for example, via techniques such as blind detection and common signaling. The periodic configuration can employ existing configuration techniques from Release 12; which can minimize the impact of implementing techniques described herein. In some embodiments, an LAA eNB can transmit NZP CSI-RS/ZP CSI-RS/CSI-IM outside of a DL burst and DRS via periodic configuration. Referring to FIG. 2, illustrated is an example scenario involving a periodic CSI-RS transmission for CSI computation within a DL burst, according to various aspects described herein.

Figure 3:
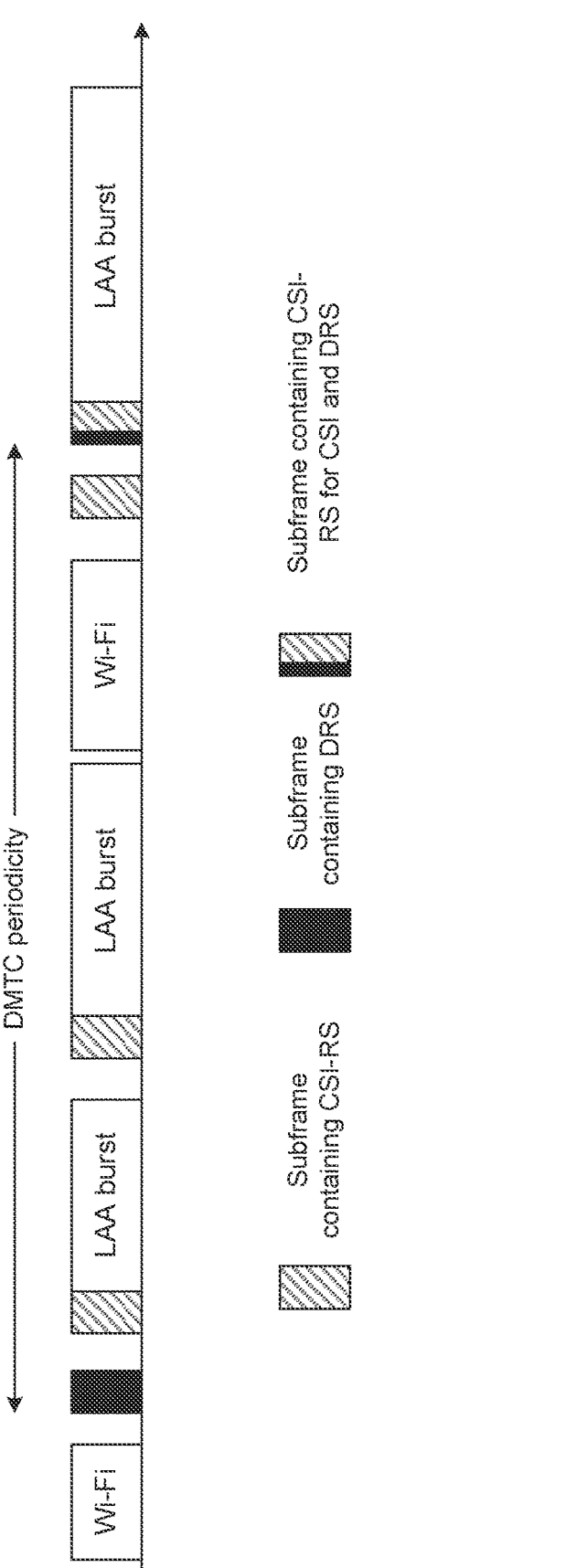
FIG. 3 is an example scenario involving an aperiodic CSI-RS transmission for CSI computation within a DL burst, according to various aspects described herein.

For aperiodic configurations, a UE can be configured to receive NZP CSI-RS/ZP CSI-RS/CSI-IM at aperiodic occasions. In such aspects, the eNB can implicitly or explicitly indicate to the UE the NZP CSI-RS/ZP CSI-RS/CSI-IM presence in the corresponding subframe. As an example, NZP CSI-RS/ZP CSI-RS/CSI-IM can be configured with respect to the start of the DL burst. In aspects, a set of subframes $\{S_1, S_2, \ldots S_N\}$ indexed from the start of a DL burst can be configured to convey NZP CSI-RS/ZP CSI-RS/CSI-IM. In one specific example, such a set of subframes can be employed, with $S_1=1$, $S_2=5$, N=2. From the UE perspective, the start and the end of a DL burst can be detected to identify the presence of NZP CSI-RS/ZP CSI-RS/CSI-IM within the DL burst. In the same or other aspects, the eNB can indicate aperiodic NZP CSI-RS/ZP CSI-RS/CSI-IM explicitly via common signalling or UE-specific signalling for the UEs from which CSI report is needed. In some embodiments, an LAA eNB can transmit NZP CSI-RS/ZP CSI-RS/CSI-IM outside a DL burst and DRS via an aperiodic configuration using explicit signalling. Referring to FIG. 3, illustrated is an example scenario involving an aperiodic CSI-RS transmission for CSI computation within a DL burst, according to various aspects described herein.

In some aspects, a UE can be configured with both a periodic and an aperiodic NZP CSI-RS/ZP CSI-RS/CSI-IM configuration. As one example, the UE can be configured with a longer term such as the existing 40 ms periodicity, while the UE can also be configured with aperiodic NZP CSI-RS/ZP CSI-RS/CSI-IM transmission within the 1st and 5th subframes of a DL burst. If high frequency of CSI-RS transmissions is allowed via periodic configuration, additional aperiodic CSI-RS transmissions can be omitted.

In addition to CSI-RS transmissions within a DL burst, the CSI-RS can be also transmitted in a DRS burst that can comprise 12 OFDM symbols. In such aspects, the CSI-RS configurations containing symbols 12 and 13 are not transmitted within DRS. Based on Table 6.10.5.2-1 in 3GPP TS (technical specification) 36.211, existing CSI-RS configurations other than configurations 4, 9, 18, and 19 can be used in DRS.

CSI-RS within DRS can be used for performing CSI measurements, as a UE can be configured with DRS and CSI-RS in the same subframe for the purpose of CSI measurement using the configured CSI-RS. If CSI-RS configuration within DRS is the same as that of the CSI-RS configuration used for CSI measurements in DL burst, then CSI-RS configuration for DRS can implicitly exclude configurations 4, 9, 18, and 19. A UE can be configured with the same NZP CSI-RS configurations (RE mapping within a subframe) for periodic CSI-RS transmission and DRS transmission. It is possible that the DRS occasion and periodic CSI-RS transmission occur within the same subframe. In such scenarios, it is possible (if conventional techniques are employed) that a UE may not correctly perform the RRM measurements and the CSI measurements on the same NZP CSI-RS transmissions due to dynamic power allocation for every DL burst as the number of component carriers used for DL burst can differ for every DL burst. In these scenarios, multiple options can be employed.

In accordance with a first option, scenarios employing the same periodic CSI-RS and DRS configuration can be excluded.

In accordance with a second option, CSI-RS within the considered subframe can use the CSI-RS configuration and transmission power for DRS transmission. The UE can avoid performing CSI measurements using the considered subframe when DRS is detected, and the UE is configured with same periodic CSI-RS and DRS configuration.

In accordance with a third option, CSI-RS can use the DRS configuration and transmission power with the subframe. In the CSI report, the UE can compute CSI explicitly based on the considered subframe without performing averaging across multiple subframes. The UE can indicate the CSI-RS index to the eNB, so that the eNB can scale and/or correct the CSI measurements based on the actual transmission power. If the DL burst transmission power is explicitly indicated, the UE can perform CSI measurement by appropriately scaling the received CSI-RS.

In accordance with a fourth option, the CSI-RS within the considered subframe can use a periodic CSI-RS configuration and the transmission power for the DL burst. However, this option can lead to incorrect RSRP measurements.

The issues and options discussed above are also applicable when the REs used for periodic CSI-RS transmissions and DRS transmission overlap.

It is possible that the CSI-RS configuration within the DRS used for RRM measurements such as RSRP can be different from the CSI-RS configuration for CSI measurements. If the CSI-RS configuration within DRS is different from the CSI-RS configuration for CSI measurements, potential issues of confusion could arise at UEs. Multiple scenarios are possible regarding the choice of CSI-RS configuration to be used within DRS when CSI-RS configuration used for CSI measurements and that used for DRS configuration are different.

In a first scenario, CSI-RS/CSI-IM/DRS are in the same subframe containing PDSCH (physical downlink shared channel).

In this scenario, according to a first option, only the CSI-RS configured for CSI measurements is transmitted; however, as a result, the UE may not be able to perform RSRP measurement.

According to a second option, only the CSI-RS configured for DRS is transmitted; however, as a result, the UE cannot perform CSI measurements. In the second option, the UE can detect the presence of DRS within a DL burst and can thereby determine to not employ the corresponding subframe for CSI measurements.

According to a third option, both CSI-RS configured for CSI measurement and DRS can be transmitted; accordingly, the UE can perform RSRP measurements and the CRS measurements.

In all the above options, an issue may arise with rate matching for PDSCH/EPDCCH (enhanced physical downlink control channel). However, the UE has sufficient information regarding the presence of DRS within the considered subframe and which configuration is used for transmitting CSI-RS to correctly perform rate matching and mapping for PDSCH/EPDCCH.

In a second scenario, CSI-RS/CSI-IM/DRS are in the same subframe without PDSCH. In this scenario, because the DRS duration needs to be adhered, the CSI-RS configuration associated with the DRS can be given higher priority. If the CSI-RS configuration used for CSI measurements is a configuration other than configurations 4, 9, 18, and 19, the CSI-RS configuration associated with CSI measurement can also be transmitted.

CSI Reporting

A second set of embodiments relates to CSI reporting by a UE, which can comprise periodic CSI reporting and/or aperiodic CSI reporting.

Figure 4:
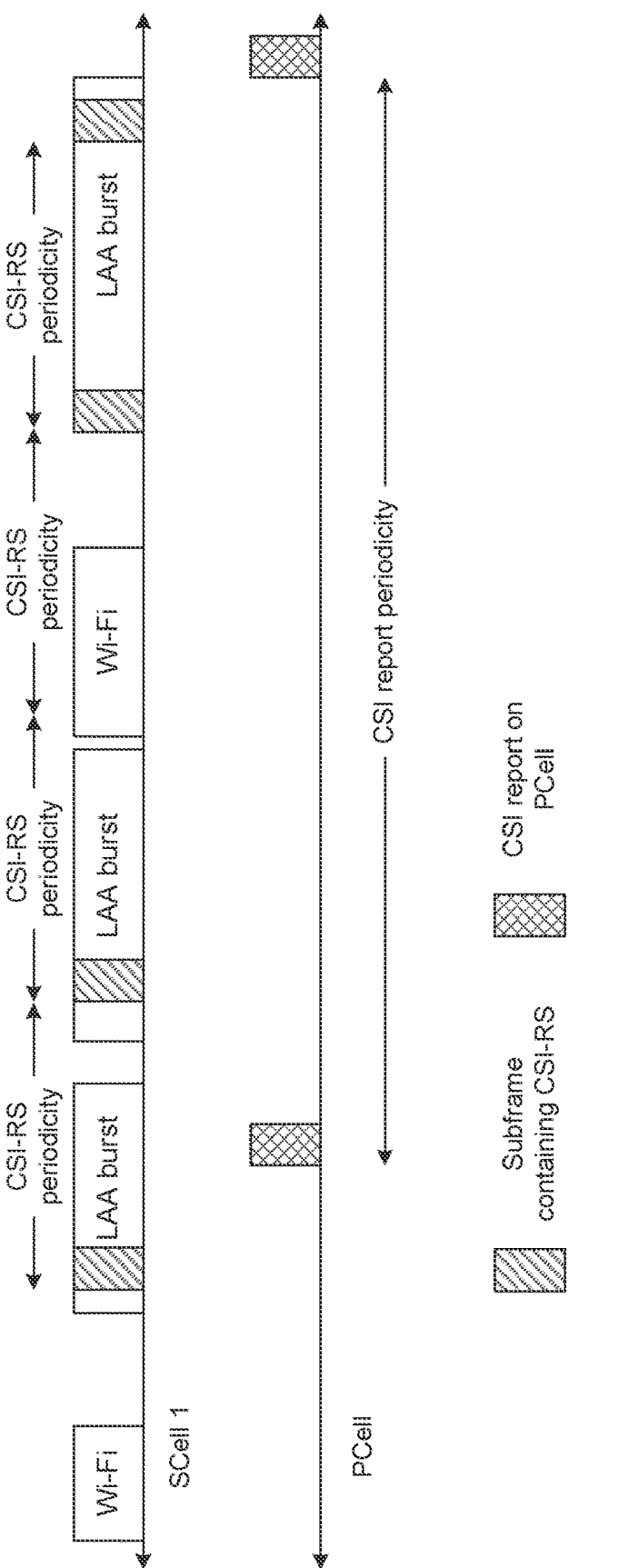
FIG. 4 is an example scenario involving periodic CSI reporting for an LAA SCell, according to various aspects described herein.

For periodic CSI reporting, a periodic CSI report can be transmitted by a UE on the PCell (or licensed carrier) by the eNB periodically assigning resources for CSI report for each configured UE without further explicit signaling. A UE can be configured with a longer period if the interference condition is not dynamically varying. However, if the interference condition is varying dynamically, then a shorter period for CSI reporting can be configured for accurate CSI updates, which can incur non-negligible overhead. In general, periodic CSI reports can be useful in low interference variation scenarios by saving UL (uplink) feedback resources. Referring to FIG. 4, illustrated is an example scenario involving periodic CSI reporting for an LAA SCell, according to various aspects described herein.

Figure 5:
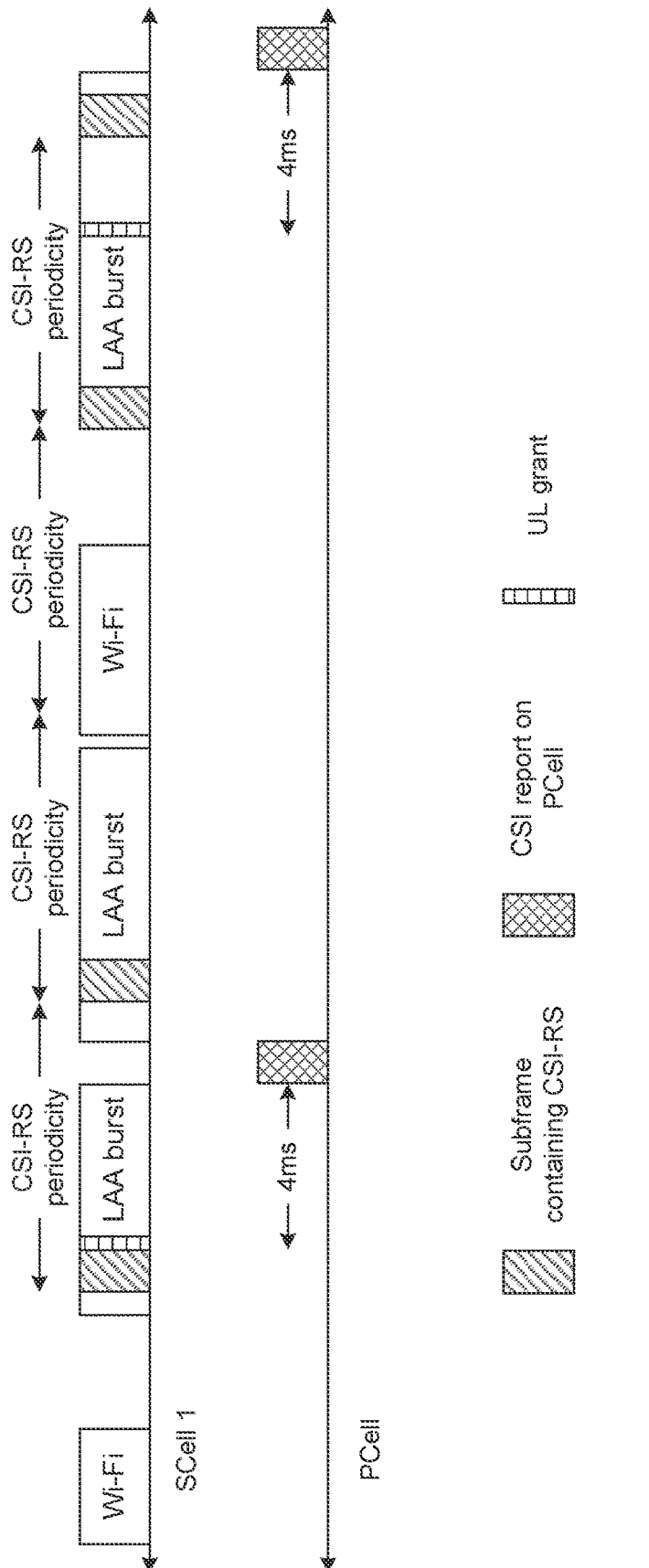
FIG. 5 is an example scenario involving periodic CSI reporting for an LAA SCell according to various aspects described herein.

In dynamically varying interference conditions, aperiodic CSI reports may provide better accuracy of CSI at the eNB than periodic CSI reporting preconfigured with a longer CSI report period. Aperiodic CSI reports can be transmitted via PCell by Release 13 compliant UEs via an eNB dynamically allocating PUSCH resources on the PCell via a UL grant. In future releases, it is possible that aperiodic CSI reports can be transmitted via PUSCH on an unlicensed carrier, which can provide a scalable approach as the number of configured unlicensed carriers is increased. Referring to FIG. 5, illustrated is an example scenario involving periodic CSI reporting for an LAA SCell according to various aspects described herein, wherein a UL grant triggers the CSI reporting event at the UE 4 ms after the transmission of the UL grant.

In scenarios wherein an eNB uses multiple component carriers (CC) for DL burst transmission, the transmission power on each component carrier may vary for each DL burst. However, the UE can assume that the CRS and CSI-RS transmission has a constant power in each subframe of the same DL transmission burst.

Figure 6:
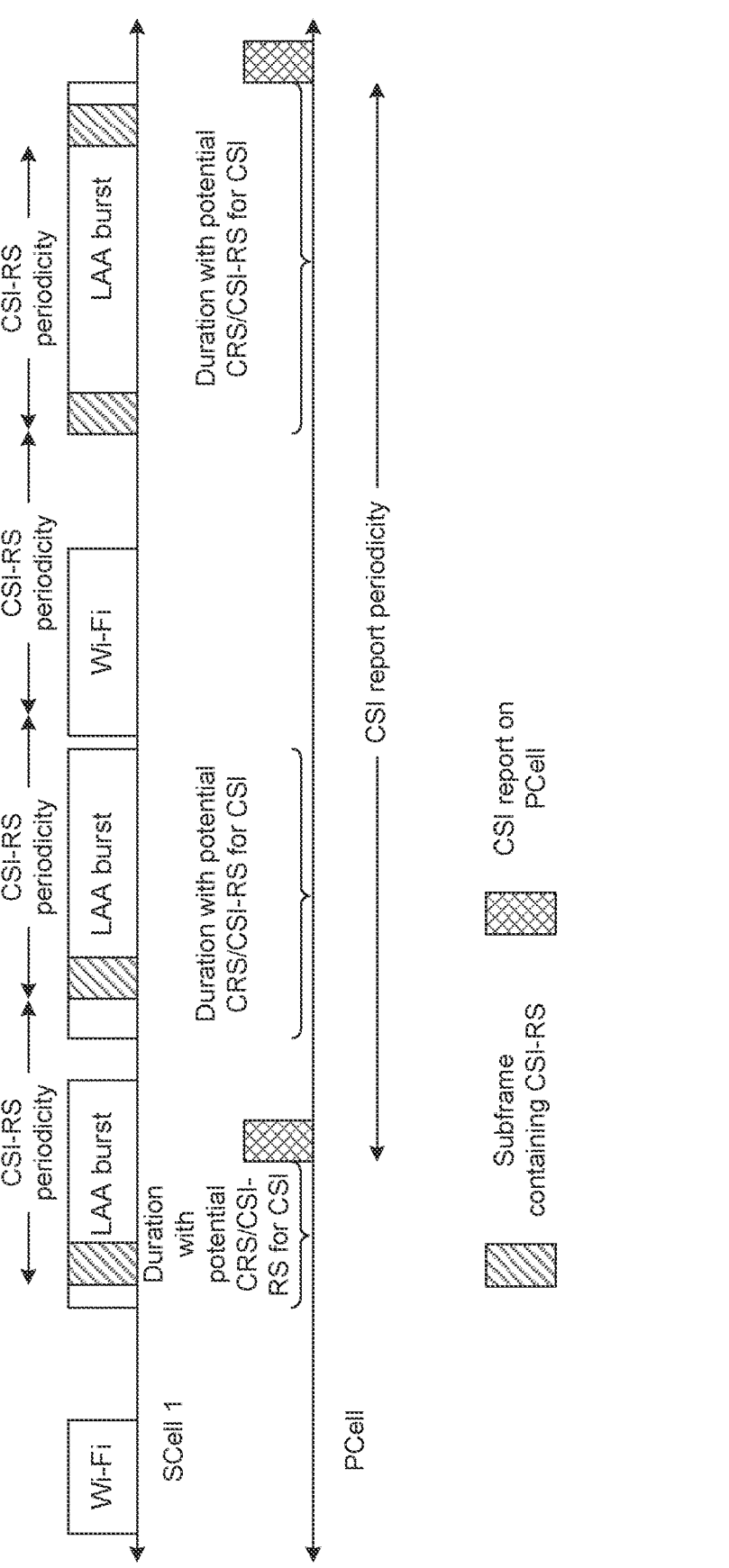
FIG. 6 is an example scenario involving periodic CSI reporting for an LAA SCell when the CSI transmit power is not explicitly indicated to the UE, according to various aspects described herein.

In one such embodiment, if the CRS/CSI-RS power is not explicitly indicated to the UE, the UE can use only the subframes within the same DL burst to compute the CSI for both periodic and aperiodic reports. For the purposes of CSI reporting, the UE can report the latest CSI computation based on the subframes received within the latest burst until the transmission instant of the CSI report. Referring to FIG. 6, illustrated is an example scenario involving periodic CSI reporting for an LAA SCell when the CSI transmit power is not explicitly indicated to the UE, according to various aspects described herein.

Figure 7:
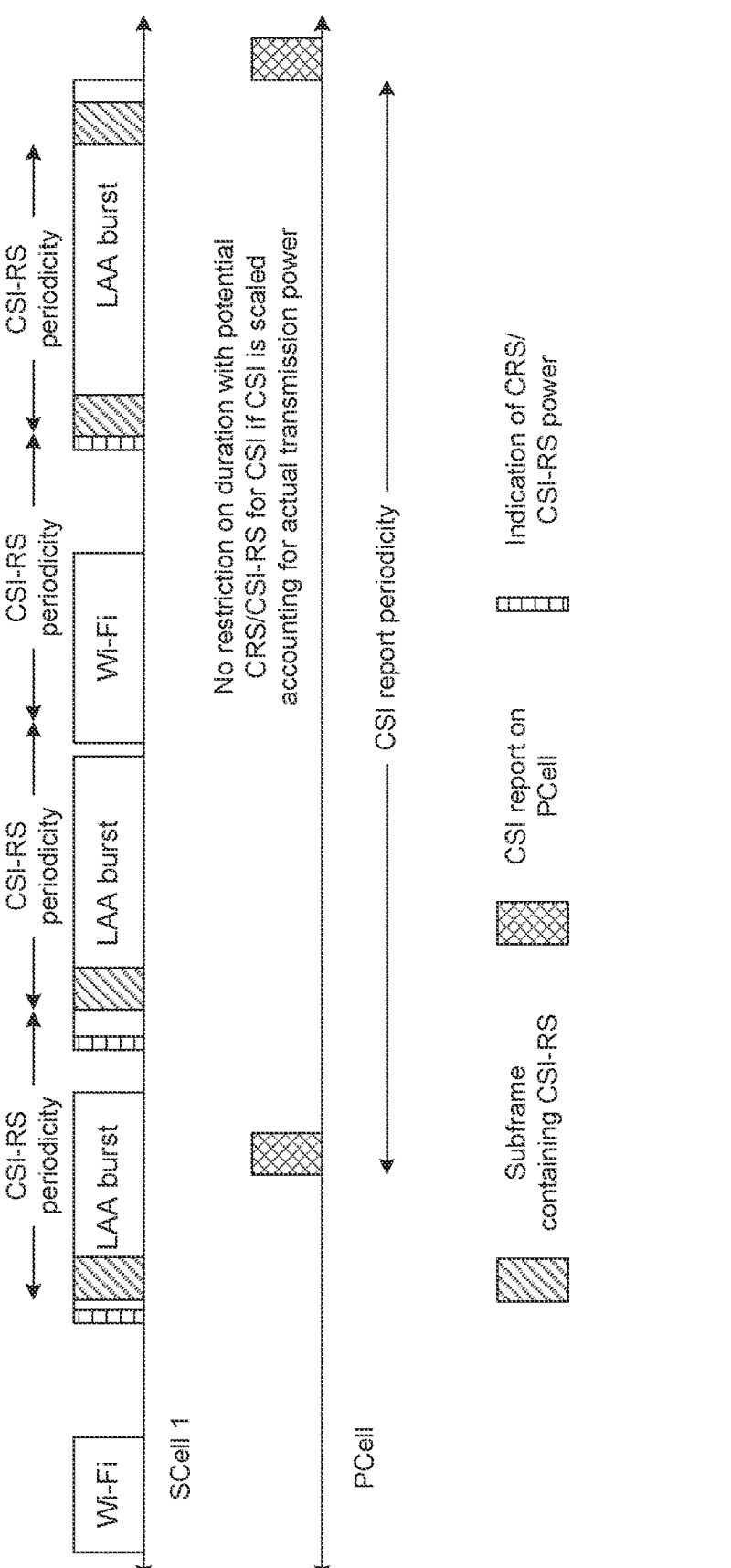
FIG. 7 is an example scenario involving periodic CSI reporting for an LAA SCell when the CSI transmit power is explicitly indicated to the UE and the UE can perform CSI scaling, according to various aspects described herein.

In another embodiment, if the CRS/CSI-RS power is explicitly indicated to the UE, the UE can appropriately scale the CSI. For example, the UE can scale the computed CSI by taking into account the transmit power(s) over DL bursts to obtain an equivalent CSI. After computing the equivalent CSI, the UE can select the set of subframes to be used for equivalent CSI computation and averaging. If a UE is not capable of scaling the CSI appropriately, the UE can employ the techniques for CSI computation in scenarios wherein the CSR/CSI-RS power is not indicated to the UE. Referring to FIG. 7, illustrated is an example scenario involving periodic CSI reporting for an LAA SCell when the CSI transmit power is explicitly indicated to the UE and the UE can perform CSI scaling, according to various aspects described herein.

Figure 8:
FIG. 8 is an example scenario involving aperiodic CSI reporting when CSI-RS is not transmitted on a CC over which a UL grant was received, according to various aspects described herein.

For aperiodic report, the subframe used for CSI computing can be explicitly indicated. For example, a UL grant can be transmitted on the SCell along with the CSI-RS within the same subframe. In this example, the UE can use only the indicated subframe to compute the CSI reported via that UL grant. Since there is an explicit timing relationship, the eNB can have a priori information regarding the transmission power used for the CRS/CSI-RS transmission that UE used for CSI (e.g., channel quality information (CQI), etc.) feedback. If the UE is configured with multiple component carriers, the UE may not receive CSI-RS on all the component carriers simultaneously, as the transmission is subject to LBT. Furthermore, it is possible that the UE can receive a CSI report request using the UL grant for CCs over which a simultaneous CSI-RS transmission is not scheduled. Referring to FIG. 8, illustrated is an example scenario involving aperiodic CSI reporting when CSI-RS is not transmitted on a CC over which a UL grant was received, according to various aspects described herein. As shown in FIG. 8, the UE can indicate the latest computed CSI for any SCell(s) over which the UL grant for the CSI request was not transmitted.

Figure 9:
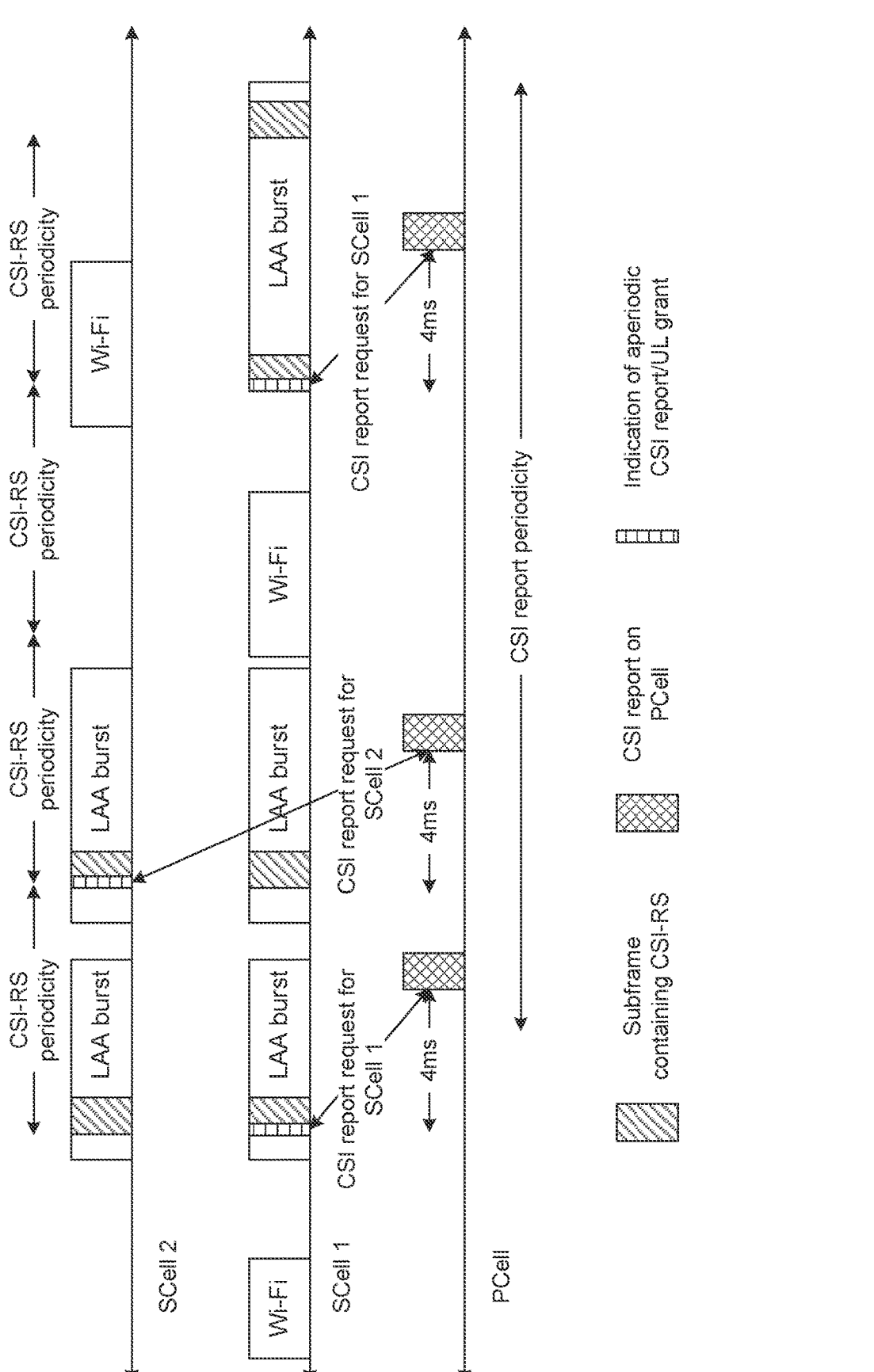
FIG. 9 is an example scenario involving aperiodic CSI reporting when a UE is configured with independent CSI reporting for multiple component carriers, according to various aspects described herein.

In other aspects, an independent CSI process can be configured for each component carrier, which can resolve the issue that simultaneous CSI-RS transmission may not be possible across component carriers. Referring to FIG. 9, illustrated is an example scenario involving aperiodic CSI reporting when a UE is configured with independent CSI reporting for multiple component carriers, according to various aspects described herein. Based on the current LTE specification allowing enhanced carrier aggregation (eCA) of up to 7 CCs, this technique is scalable up to 7 CCs, as the UE can be configured to report up to 7 independent sets of CSI reports per the current LTE specification (if future releases increase the number of independent CSI reports allowed, this technique can be scaled accordingly).

Figure 10:
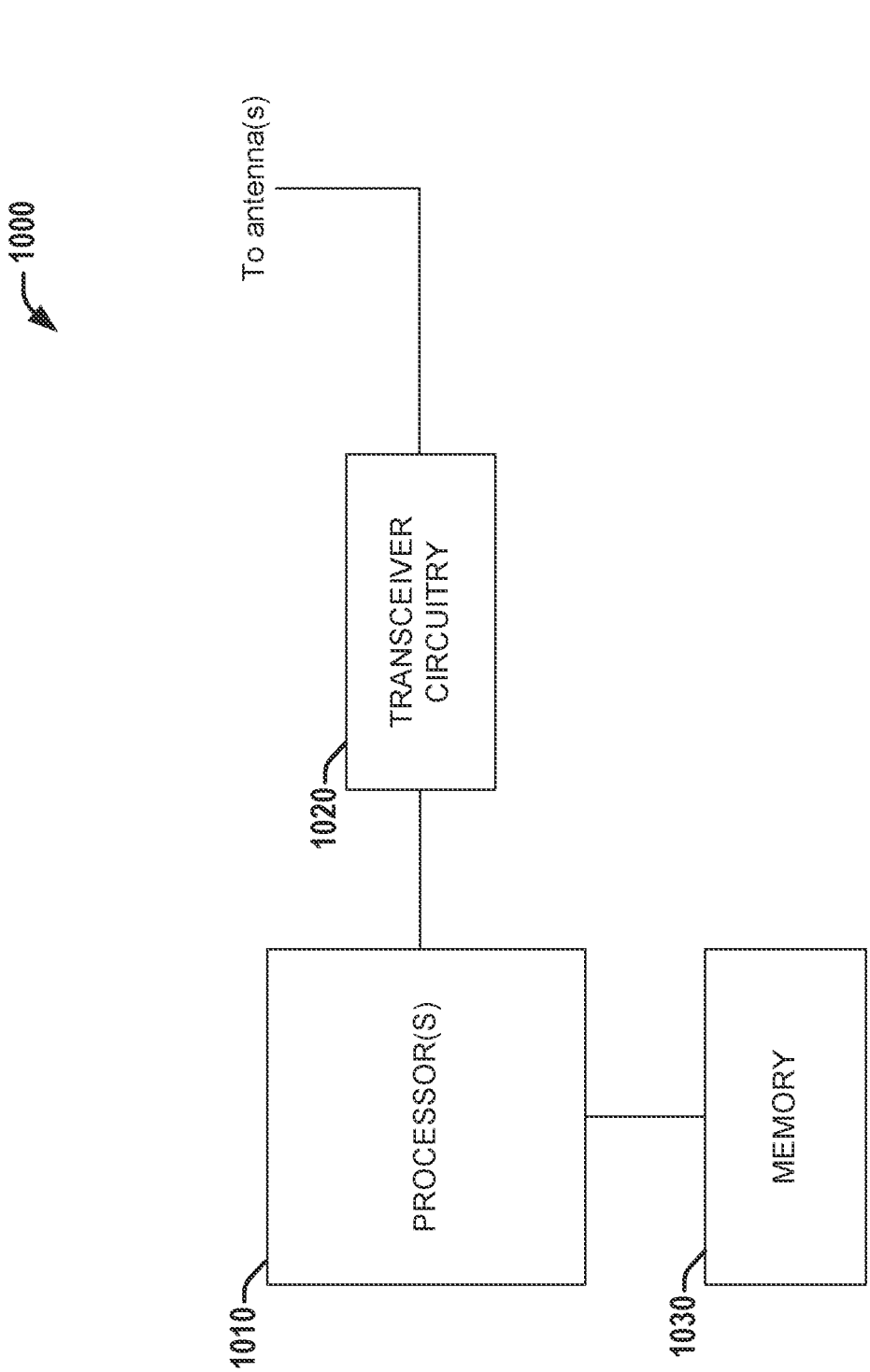
FIG. 10 is a block diagram illustrating a system that facilitates CSI measurement and reporting in connection with an LAA SCell at a UE, according to various aspects described herein.

Referring to FIG. 10, illustrated is a block diagram of a system 1000 that facilitates CSI measurement and reporting in connection with an LAA SCell at a UE, according to various aspects described herein. System 1000 can include one or more processors 1010 (e.g., one or more baseband processors such as one or more of the baseband processors discussed in connection with FIG. 1), transceiver circuitry 1020 (e.g., comprising one or more of transmitter circuitry or receiver circuitry, which can employ common circuit elements, distinct circuit elements, or a combination thereof), and a memory 1030 (which can comprise any of a variety of storage mediums and can store instructions and/or data associated with one or more of processor(s) 1010 or transceiver circuitry 1020). In various aspects, system 1000 can be included within a user equipment (UE). As described in greater detail below, system 1000 can facilitate measurement and reporting of CSI based on CRS and/or CSI-RS on a LAA SCell.

Transceiver circuitry 1020 can receive, and processor(s) 1010 can process, reference signals for CSI measurement (e.g., CRS and/or CSI-RS, such as non-zero power (NZP) CSI-RS) transmitted by a BS (e.g., Evolved NodeB (eNB), etc.) via an unlicensed carrier (e.g., an LAA SCell) during each subframe of a set of subframes that are designated for CSI channel measurements (e.g., according to a periodic CSI configuration and/or an aperiodic CSI configuration). Depending on the type of received signal or message, processing (e.g., by processor(s) 1010, etc.) can comprise one or more of: identifying physical resources associated with the signal/message, detecting the signal/message, resource element group deinterleaving, demodulation, descrambling, and/or decoding.

Processor(s) 1010 can derive and/or generate the channel measurements based on the CRS and/or the CSI-RS (whether CRS or CSI-RS transmitted by the eNB and received by transceiver circuitry 1020 is used to derive/generate channel measurements can depend on how the UE employing system 1000 is configured, such as the transmission mode, etc.).

In various aspects, transceiver circuitry 1020 also can receive interference during one or more subframes of a second set of subframes, such as in connection with one or more configured CSI-IM resources and associated zero power (ZP) CSI-RS, which can correspond to resource elements (REs) indicated via a CSI-IM configuration. In aspects, each subframe of the second set of subframes can comprise one or more occupied orthogonal frequency division multiplexing (OFDM) symbols. Processor(s) 1010 can derive and/or generate interference measurements from one or more subframes of the second set of subframes.

Processor(s) 1010 can generate CSI, which can be based at least in part on the CRS and/or CSI-RS received during at least one subframe of the set of subframes. The CSI can comprise one or more of a Channel Quality Indicator (CQI), a precoding matrix indicator (PMI), a precoding type indicator (PTI), a CSI-RS resource indicator (CRI), and/or a rank indication (RI). For CQI, processor(s) 1010 can determine the CQI based on channel measurements from a single subframe of the set of subframes, or based on an average of channel measurements from multiple subframes of the set of subframes.

If the transmit power of CRS and/or CSI-RS is not explicitly indicated, the UE can ensure that channel measurements from multiple subframes which are averaged are from a single transmission burst. To ensure channel measurements from multiple transmission bursts (e.g., which may have different transmit powers for CRS and/or CSI-RS) are not averaged, the UE can ensure that the channel was continually occupied through those subframes.

For example, in connection with CSI-RS, processor(s) 1010 can determine to not average CSI-RS measurement in a first subframe (e.g., subframe $n_1$) with CSI-RS measurement in a later second subframe (e.g., subframe $n_2$), if any OFDM symbol of the first subframe or any subframe from between the first subframe through the second subframe, is not occupied. Thus, in CSI-RS scenarios, processor(s) 1010 can average channel measurements from the first and second subframes when each OFDM symbol of the first subframe is occupied, each OFDM symbol of the second subframe is occupied, and each OFDM symbol between the first subframe and the second subframe is occupied.

As another example, in connection with CRS, processor(s) 1010 can determine to not average CRS measurement in the first subframe with CRS measurement in the later second subframe, if any OFDM symbol of the second slot of the first subframe, or any OFDM symbol between the first subframe and the second subframe, or any of the first 3 OFDM symbols of the second subframe, is not occupied. Thus, in CRS scenarios, processor(s) 1010 can average channel measurements from the first and second subframes when each OFDM symbol of the second slot of the first subframe is occupied, each of the first 3 OFDM symbols of the second subframe is occupied, and each OFDM symbol between the first subframe and the second subframe is occupied.

If the transmit power of CRS and/or CSI-RS is explicitly indicated, processor(s) 1010 can scale measurements based on the associated transmit power, and can average scaled measurements regardless of whether they are from the same or different transmission bursts.

Processor(s) 1010 can generate a CSI report that comprises the CSI, and can output the CSI report to transceiver circuitry 1020 for transmission by transceiver circuitry 1020 to an eNB. Depending on the type of signal or message generated, outputting for transmission (e.g., by processor(s) 1010, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.).

In some aspects, processor(s) 1010 can be configured for periodic CSI reporting. In such aspects, CSI measurements can be based on CSI-RS associated with a periodic CSI configuration, and processor(s) 1010 can output the CSI report for transmission based at least in part on encoding the CSI report for transmission via a PUCCH (physical uplink control channel). Periodic CSI configurations can reduce signaling overhead in slowly varying interference conditions. Because LAA burst transmissions can be limited by a maximum channel occupancy time (MCOT), for example, 4 ms in Japan, in aspects, the periodicity of periodic CSI configurations employed in various aspects described herein can be less than the MCOT (e.g., 2 ms, 3 ms, etc.).

In the same or other aspects, processor(s) 1010 can be configured for aperiodic CSI reporting (e.g., only for aperiodic CSI reporting, or for aperiodic CSI reporting and periodic CSI reporting, such as with a longer reporting periodicity, etc.). In such aspects, CSI measurements can be based on CSI-RS associated with an aperiodic CSI configuration, and processor(s) 1010 can generate the CSI report in response to an UL grant received by transceiver circuitry 1020 from an eNB. Processor(s) 1010 can output the aperiodic CSI report for transmission based at least in part on modulating the aperiodic CSI report for a physical uplink shared channel (PUSCH). In aspects, processor(s) can employ one of a QPSK (quadrature phase shift keying), 16QAM (16-state quadrature amplitude modulation), or a 64QAM modulation scheme. Processor(s) 1010 can determine the set of subframes for channel measurements based on explicit signaling, or based on a predetermined pattern, for example, specific subframes indexed from the beginning of each LAA burst transmission.

Figure 11:
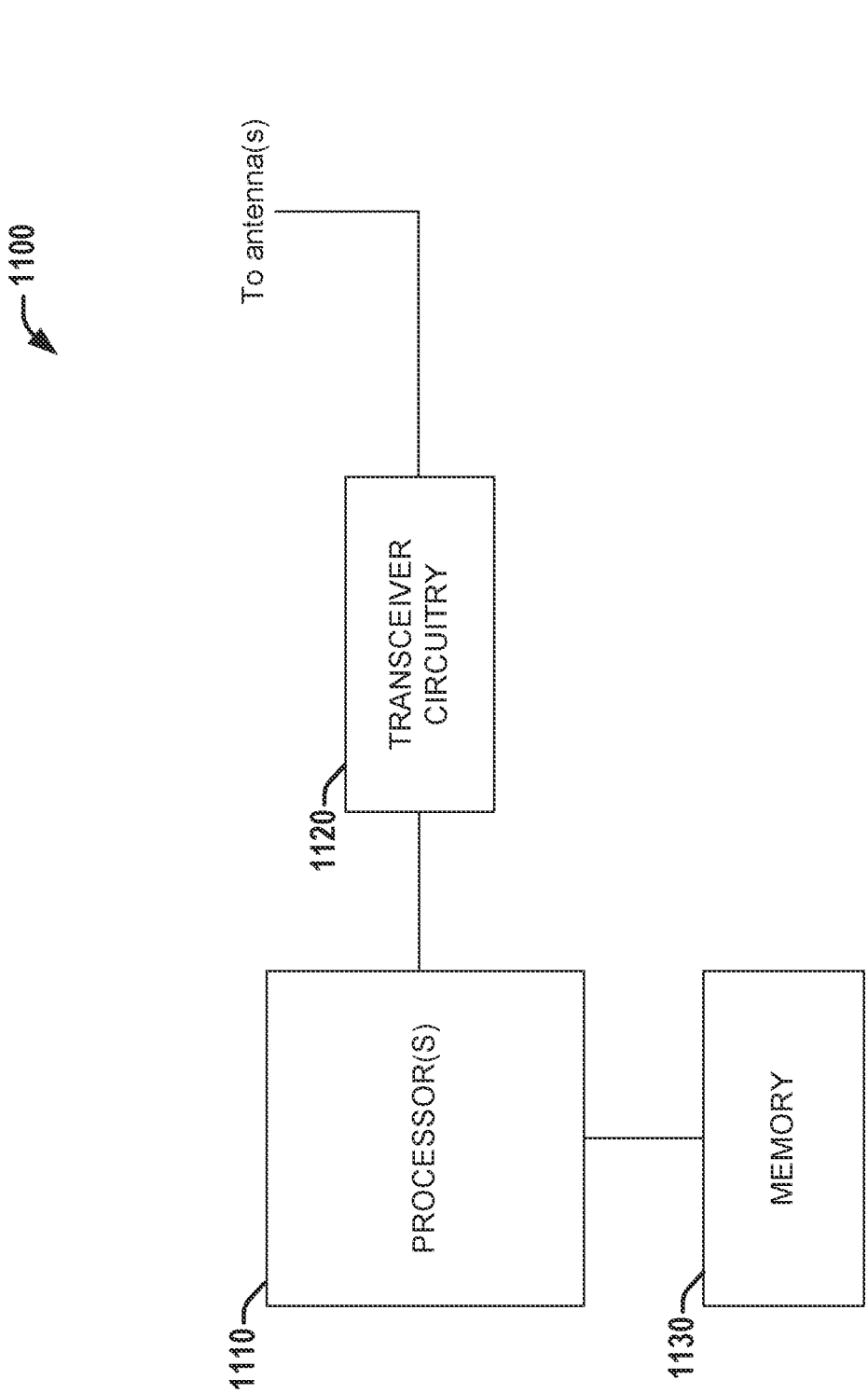
FIG. 11 is a block diagram illustrating a system that facilitates generation of CRS and/or CSI-RS for a LAA SCell at a base station according to various aspects described herein.

Referring to FIG. 11, illustrated is a block diagram of a system 1100 that facilitates generation of CRS and/or CSI-RS for a LAA SCell at a base station according to various aspects described herein. System 1100 can include one or more processors 1110 (e.g., one or more baseband processors such as one or more of the baseband processors discussed in connection with FIG. 1), transceiver circuitry 1120 (e.g., which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 1130 (which can comprise any of a variety of storage mediums and can store instructions and/or data associated with one or more of processor(s) 1110 or transceiver circuitry 1120). In various aspects, system 1100 can be included within an Evolved Universal Terrestrial Radio Access Network (E-UTRAN) Node B (Evolved Node B, eNodeB, or eNB) or other base station in a wireless communications network. In some aspects, the processor(s) 1110, transceiver circuitry 1120, and the memory 1130 can be included in a single device, while in other aspects, they can be included in different devices, such as part of a distributed architecture. As described in greater detail below, system 1100 can facilitate generation of CRS and/or CSI-RS on LAA SCells and processing of CSI reports that comprise CSI for LAA SCells.

Transceiver circuitry 1120 can monitor a set of unlicensed carriers in connection with a LBT protocol, and processor(s) 1110 can perform a clear channel assessment (CCA) on each unlicensed carrier of the set of unlicensed carriers. Based on the CCA, processor(s) 1110 can determine a subset (e.g., N unlicensed carriers) of the set of unlicensed carriers that are available to transmit on.

Processor(s) 1110 can generate a DL transmission to be transmitted by transceiver circuitry 1120 on the N unlicensed carriers. In connection with the DL transmission, processor(s) 1110 can schedule a set of reference signals for CSI measurement (e.g., CRS and/or CSI-RS) during one or more subframes of the DL transmission. In various aspects, these subframes can be selected based on a periodic CSI configuration, an aperiodic CSI configuration, or both. In aspects wherein the DL transmission comprises a DRS burst, CSI-RS scheduled in connection with a periodic CSI configuration can be assigned the same antenna ports as CSI-RS scheduled in a DRS burst for RRM purposes (e.g., RSRP, etc.), or can be scheduled independently of CSI-RS scheduled in the DRS burst for RRM.

Processor(s) 1110 can assign a transmit power for the set of reference signals for CSI measurement scheduled in the DL transmission, which can be based on the number of unlicensed carriers in the subset of available subcarriers, N (for example, the combined transmit power of the N unlicensed carriers may be limited based on a maximum allowed transmit power).

Transceiver circuitry 1120 can transmit the DL transmission via the N unlicensed carriers, and can receive a CSI report from a given UE that can comprise CSI determined based on at least one unlicensed carrier of the set of unlicensed carriers (e.g., one or more of the N unlicensed carriers, one or more other unlicensed carriers of the set of unlicensed carriers, or a combination thereof). Processor(s) 1110 can process the CSI report.

Figure 12:
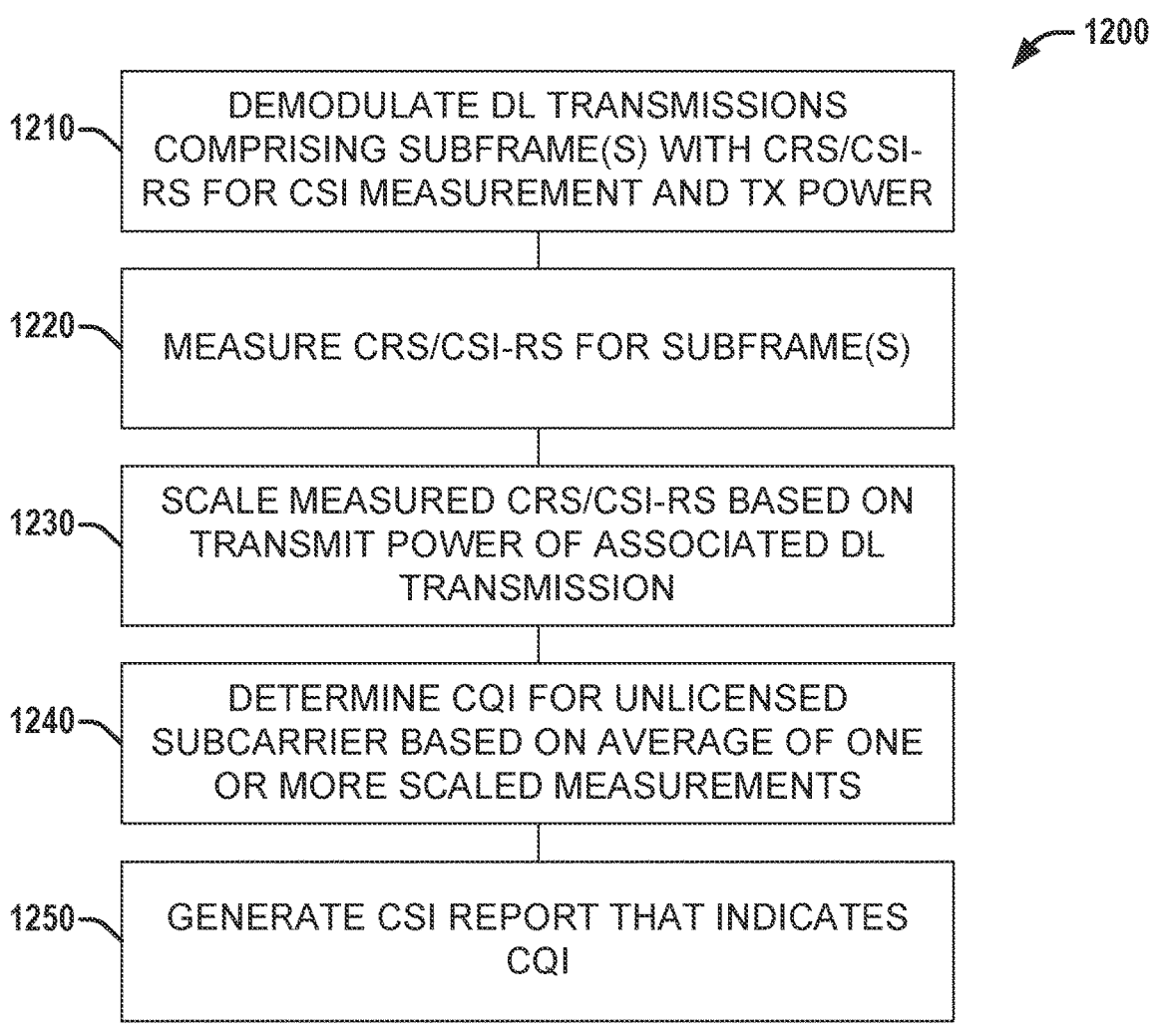
FIG. 12 is a flow diagram illustrating a method that facilitates generation of a CSI report for a LAA SCell a UE according to various aspects described herein.

Referring to FIG. 12, illustrated is a flow diagram of a method 1200 that facilitates generation of a CSI report for a LAA SCell a UE according to various aspects described herein. In some aspects, method 1200 can be performed at a UE. In other aspects, a machine readable medium can store instructions associated with method 1200 that, when executed, can cause a UE to perform the acts of method 1200.

At 1210, a set of DL transmissions on an unlicensed subcarrier can be demodulated, wherein one or more of the DL transmissions can comprise at least one subframe with CRS and/or CSI-RS for CSI measurement, and can indicate a transmit power for the CRS and/or CSI-RS.

At 1220, the CRS and/or CSI-RS for subframes with CRS and/or CSI-RS can be measured.

At 1230, the measured CRS and/or CSI-RS for each subframe can be scaled based on the transmit power indicated for the DL transmission that comprises that subframe.

At 1240, a CQI can be determined for the unlicensed subcarrier based on an average of one or more of the scaled measured CRS and/or CSI-RS.

At 1250, a CSI report can be generated that comprises the CQI.

Figure 13:
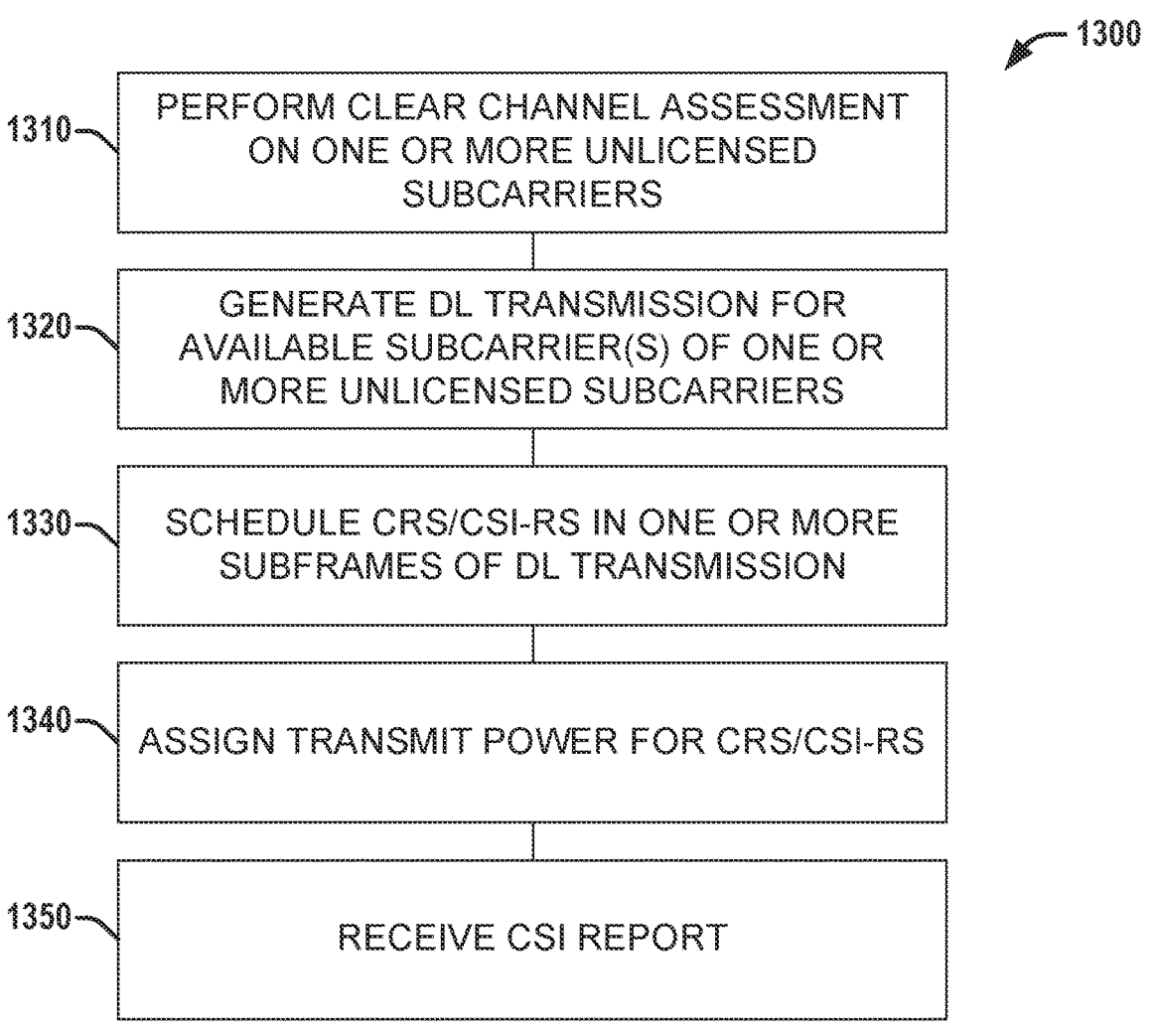
FIG. 13 is a flow diagram illustrating a method that facilitates generating CRS and/or CSI-RS on one or more LAA SCells and processing of CSI reports for the one or more LAA SCells by a base station according to various aspects described herein.

Referring to FIG. 13, illustrated is a flow diagram of a method 1300 that facilitates generating CRS and/or CSI-RS on one or more LAA SCells and processing of CSI reports for the one or more LAA SCells by a base station according to various aspects described herein. In some aspects, method 1300 can be performed at an eNB. In other aspects, a machine readable medium can store instructions associated with method 1300 that, when executed, can cause an eNB to perform the acts of method 1300.

At 1310, a clear channel assessment can be performed on one or more unlicensed subcarriers before a planned DL transmission to determine one or more available unlicensed subcarriers.

At 1320, the DL transmission can be generated for the one or more available unlicensed subcarriers.

At 1330, CRS/CSI-RS can be scheduled in one or more subframes of the DL transmission.

At 1340, a transmit power for the scheduled CRS/CSI-RS can be assigned (e.g., which can depend on the number of available unlicensed subcarriers).

At 1350, a CSI report can be received, which can comprise CSI for at least one of the one or more unlicensed subcarriers.

In various aspects discussed herein, for CSI channel measurement, a UE can avoid averaging CRS/CSI-RS measurements across transmission bursts, either by using measurement from only a single subframe, or by averaging measurements only within a single LAA transmission burst. The decision of whether to average CRS/CSI-RS measurements across subframes or not from within a transmission burst can vary between embodiments, depending on the implementation within that UE. For a CSI report in a subframe n, the UE's CSI measurement can be from within the transmission burst to which the CSI reference resource belongs.

In embodiments employing periodic CSI-RS for channel measurement, the periodic CSI-RS for channel measurement and the CSI-RS configured in DRS for RRM can be independently configured.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed within a User Equipment (UE), comprising one or more processors and a memory. The one or more processors are configured to: derive, for each subframe of a set of subframes of a license assisted access (LAA) secondary cell (SCell), one or more channel measurements based on reference signals in that subframe, wherein the reference signals in that subframe comprise cell-specific reference signals (CRS) or channel state information (CSI) reference signals (CSI-RS); generate CSI, wherein the CSI comprises a channel quality indicator (CQI) based at least in part on an average of the one or more channel measurements from multiple subframes of the set of subframes, wherein the multiple subframes comprise a first subframe and a later second subframe, wherein each orthogonal frequency division multiplexing (OFDM) symbol of a second slot of the first subframe is occupied, wherein each of a first three OFDM symbols of the second subframe are occupied, and wherein each OFDM symbol between the first subframe and the second subframe is occupied; and generate a CSI report that indicates the CSI.

Example 2 comprises the subject matter of any variation of example 1, wherein the CQI is further based at least in part on one or more interference measurements, wherein the one or more interference measurements are derived from a second set of subframes, wherein each subframe of the second set of subframes comprises one or more occupied OFDM symbols.

Example 3 comprises the subject matter of any variation of any of examples 1-2, wherein, for each subframe of the set of subframes, the reference signals comprise the CRS.

Example 4 comprises the subject matter of any variation of any of examples 1-2, wherein, for each subframe of the set of subframes, the reference signals comprises the CSI-RS, and wherein each OFDM symbol of the first subframe and each OFDM symbol of the second subframe is occupied.

Example 5 comprises the subject matter of any variation of example 4, wherein the CSI-RS are associated with a periodic CSI configuration, wherein the CSI report is a periodic CSI report, and wherein the one or more processors are further configured to encode the periodic CSI report for a physical uplink control channel (PUCCH).

Example 6 comprises the subject matter of any variation of example 5, wherein the periodic CSI configuration has a periodicity less than a maximum channel occupancy time (MCOT) associated with the LAA SCell.

Example 7 comprises the subject matter of any variation of example 5, wherein the CSI-RS comprise non-zero power (NZP) CSI-RS.

Example 8 comprises the subject matter of any variation of example 4, wherein the CSI-RS comprise zero power (ZP) CSI-RS associated with one or more CSI-interference measurement (CSI-IM) resources configurations.

Example 9 comprises the subject matter of any variation of example 4, wherein the CSI-RS are associated with an aperiodic CSI configuration, wherein the CSI report is an aperiodic CSI report, and wherein the one or more processors are further configured to modulate the aperiodic CSI report for a physical uplink shared channel (PUSCH) according to one of a QPSK (Quadrature Phase Shift Keying), a 16QAM (Quadrature Amplitude Modulation), or a 64QAM modulation scheme.

Example 10 comprises the subject matter of any variation of example 9, wherein the set of subframes comprise a subset of a set of predetermined subframes indexed from the start of the most recent transmission.

Example 11 comprises the subject matter of any variation of any of examples 1-2, wherein the CSI comprises one or more of a precoding matrix indicator (PMI), a precoding type indicator (PTI), a CSI-RS resource indicator (CRI), or a rank indication (RI).

Example 12 comprises the subject matter of any variation of any of examples 1-2, wherein the one or more processors are further configured to make a determination whether to average or not average the one or more channel measurements from the first subframe with the one or more channel measurements from the second subframe, wherein the determination is made to not average based on at least one of: any OFDM symbol of the second slot of the first subframe is not occupied, any of the first three OFDM symbols of the second subframe is not occupied, or any OFDM symbol between the first subframe and the second subframe is not occupied.

Example 13 comprises the subject matter of any variation of any of examples 1-2, further comprising a transceiver circuitry configured to receive the reference signals and to transmit the CSI report.

Example 14 comprises the subject matter of any variation of any of examples 1-6, wherein the CSI comprises one or more of a precoding matrix indicator (PMI), a precoding type indicator (PTI), a CSI-RS resource indicator (CRI), or a rank indication (RI).

Example 15 comprises the subject matter of any variation of any of examples 1-6 or 14, wherein the one or more processors are further configured to make a determination whether to average or not average the one or more channel measurements from the first subframe with the one or more channel measurements from the second subframe, wherein the determination is made to not average based on at least one of: any OFDM symbol of the second slot of the first subframe is not occupied, any of the first three OFDM symbols of the second subframe is not occupied, or any OFDM symbol between the first subframe and the second subframe is not occupied.

Example 16 comprises the subject matter of any variation of any of examples 1-6 or 14-15, further comprising a transceiver circuitry configured to receive the reference signals and to transmit the CSI report.

Example 17 comprises the subject matter of any variation of example 1, wherein, for each subframe of the set of subframes, the reference signals comprise the CRS.

Example 18 comprises the subject matter of any variation of example 1, wherein, for each subframe of the set of subframes, the reference signals comprises the CSI-RS, and wherein each OFDM symbol of the first subframe and each OFDM symbol of the second subframe is occupied.

Example 19 comprises the subject matter of any variation of example 1, wherein the CSI comprises one or more of a precoding matrix indicator (PMI), a precoding type indicator (PTI), a CSI-RS resource indicator (CRI), or a rank indication (RI).

Example 20 comprises the subject matter of any variation of example 1, wherein the one or more processors are further configured to make a determination whether to average or not average the one or more channel measurements from the first subframe with the one or more channel measurements from the second subframe, wherein the determination is made to not average based on at least one of: any OFDM symbol of the second slot of the first subframe is not occupied, any of the first three OFDM symbols of the second subframe is not occupied, or any OFDM symbol between the first subframe and the second subframe is not occupied.

Example 21 comprises the subject matter of any variation of example 1, further comprising a transceiver circuitry configured to receive the reference signals and to transmit the CSI report.

Example 22 is an apparatus configured to be employed within a User Equipment (UE), comprising one or more processors and a memory. The one or more processors are configured to: measure, for an unlicensed subcarrier, a distinct set of measurements for each subframe of a plurality of subframes comprising reference signals for CSI measurement, wherein the distinct sets of measurements comprise at least one distinct set of measurements associated with a most recent downlink (DL) transmission over the unlicensed subcarrier; determine a channel quality indicator (CQI) based at least in part on an average of one or more of the at least one distinct set of measurements associated with the most recent DL transmission over the unlicensed subcarrier; and generate a CSI report comprising the CQI.

Example 23 comprises the subject matter of any variation of example 22, wherein the CQI is also based at least in part on one or more interference measurements of the unlicensed subcarrier in connection with resource elements (REs) indicated via a CSI-interference measurement (CSI-IM) configuration.

Example 24 comprises the subject matter of any variation of any of examples 22-23, wherein each subframe of a plurality of subframes for CSI measurement comprises a set of cell-specific reference signals (CRS) scheduled in that subframe, and wherein the distinct set of measurements associated with that subframe is measured based on the set of CRS scheduled in that subframe.

Example 25 comprises the subject matter of any variation of any of examples 22-23, wherein each subframe of a plurality of subframes for CSI measurement comprises a set of CSI reference signals (CSI-RS) scheduled in that subframe, and wherein the distinct set of measurements associated with that subframe is measured based on the set of CSI-RS scheduled in that subframe.

Example 26 comprises the subject matter of any variation of any of examples 22-23, wherein the CSI report comprises a precoding matrix indicator (PMI) based at least in part on one or more of the distinct sets of measurements.

Example 27 comprises the subject matter of any variation of any of examples 22-23, wherein the CSI report comprises a rank indication (RI) based at least in part on one or more of the distinct sets of measurements.

Example 28 comprises the subject matter of any variation of any of examples 22-25, wherein the CSI report comprises a precoding matrix indicator (PMI) based at least in part on one or more of the distinct sets of measurements.

Example 29 comprises the subject matter of any variation of any of examples 22-25 or 28, wherein the CSI report comprises a rank indication (RI) based at least in part on one or more of the distinct sets of measurements.

Example 30 comprises the subject matter of any variation of example 22, wherein each subframe of a plurality of subframes for CSI measurement comprises a set of cell-specific reference signals (CRS) scheduled in that subframe, and wherein the distinct set of measurements associated with that subframe is measured based on the set of CRS scheduled in that subframe.

Example 31 comprises the subject matter of any variation of example 22, wherein each subframe of a plurality of subframes for CSI measurement comprises a set of CSI reference signals (CSI-RS) scheduled in that subframe, and wherein the distinct set of measurements associated with that subframe is measured based on the set of CSI-RS scheduled in that subframe.

Example 32 comprises the subject matter of any variation of example 22, wherein the CSI report comprises a precoding matrix indicator (PMI) based at least in part on one or more of the distinct sets of measurements.

Example 33 comprises the subject matter of any variation of example 22, wherein the CSI report comprises a rank indication (RI) based at least in part on one or more of the distinct sets of measurements.

Example 34 is a machine readable medium comprising instructions that, when executed, cause a User Equipment (UE) to: demodulate a plurality of downlink (DL) transmissions that each comprise one or more associated subframes comprising a set of reference signals for channel state information (CSI) measurement, wherein each DL transmission indicates an associated transmit (Tx) power and is via an associated subset of a set of unlicensed subcarriers; measure, for each DL transmission of the plurality of DL transmissions, the set of reference signals for CSI measurement for each of the one or more associated subframes, for each unlicensed subcarrier of the associated subset of the set of unlicensed carriers; for each DL transmission of the plurality of DL transmissions, scale the set of reference signals measured for each of the one or more associated subframes of that DL transmission based on the associated Tx power indicated by that DL transmission to obtain a scaled set of reference signals for that subframe; determine an associated CQI for one or more subcarriers of the set of unlicensed subcarriers, wherein each associated CQI is based on at least one scaled set of reference signals for that unlicensed subcarrier for two or more DL transmissions of the plurality of DL transmissions; and generate a CSI report that indicates the associated CQI for each of the one or more subcarriers.

Example 35 comprises the subject matter of any variation of example 34, wherein the reference signals for CSI measurement comprise a set of cell-specific reference signals (CRS).

Example 36 comprises the subject matter of any variation of example 34, wherein the reference signals for CSI measurement comprise a set of CSI reference signals (CSI-RS).

Example 37 comprises the subject matter of any variation of any of examples 34-36, wherein the CSI report is a periodic CSI report, and wherein the CSI report is generated based at least in part on encoding the CSI report for a physical uplink control channel (PUCCH).

Example 38 comprises the subject matter of any variation of any of examples 34-36, wherein the CSI report is an aperiodic CSI report, and wherein the CSI report is generated based at least in part on modulating the CSI report for a physical uplink shared channel (PUSCH).

Example 39 comprises the subject matter of any variation of example 34, wherein the CSI report is a periodic CSI report, and wherein the CSI report is generated based at least in part on encoding the CSI report for a physical uplink control channel (PUCCH).

Example 40 comprises the subject matter of any variation of example 34, wherein the CSI report is an aperiodic CSI report, and wherein the CSI report is generated based at least in part on modulating the CSI report for a physical uplink shared channel (PUSCH).

Example 41 is an apparatus configured to be employed within an Evolved NodeB (eNB), comprising one or more processors and a memory. The one or more processors are configured to: perform a clear channel assessment on a set of unlicensed subcarriers to determine an available subset of the set of unlicensed subcarriers, wherein the available subset comprises N unlicensed carriers; generate a downlink (DL) transmission for the available subset of the set of unlicensed carriers; schedule a distinct set of reference signals for channel state information (CSI) measurement during each of one or more subframes of the DL transmission; assign a transmit (Tx) power for the distinct set of reference signals for channel state information (CSI) measurement during each of one or more subframes, wherein the Tx power is based at least in part on N; and process a CSI report that indicates a distinct set of reported CSI values for each of one or more unlicensed subcarriers of the set of unlicensed subcarriers.

Example 42 comprises the subject matter of any variation of example 41, wherein the set of reference signals for CSI measurement comprise cell-specific reference signals (CRS).

Example 43 comprises the subject matter of any variation of example 41, wherein the set of reference signals for CSI measurement comprise CSI reference signals (CSI-RS) scheduled based on a periodic configuration, and wherein the CSI report is a periodic CSI report processed based at least in part on decoding a physical uplink control channel (PUCCH).

Example 44 comprises the subject matter of any variation of example 43, wherein the CSI-RS scheduled based on a periodic configuration are assigned to a common set of antenna ports with a set of CSI-RS configured in a discovery reference signal (DRS) burst for radio resource management (RRM).

Example 45 comprises the subject matter of any variation of example 43, wherein the CSI-RS scheduled based on a periodic configuration are configured independently of a set of CSI-RS configured in a discovery reference signal (DRS) burst for radio resource management (RRM).

Example 46 comprises the subject matter of any variation of example 41, wherein the set of reference signals for CSI measurement comprise CSI reference signals (CSI-RS) scheduled based on an aperiodic configuration, and wherein the CSI report is an aperiodic CSI report processed based at least in part on demodulating a physical uplink shared channel (PUSCH).

Example 47 is an apparatus configured to be employed within a User Equipment (UE), comprising means for processing and means for storing. The means for processing is configured to: demodulate a plurality of downlink (DL) transmissions that each comprise one or more associated subframes comprising a set of reference signals for channel state information (CSI) measurement, wherein each DL transmission indicates an associated transmit (Tx) power and is via an associated subset of a set of unlicensed subcarriers; measure, for each DL transmission of the plurality of DL transmissions, the set of reference signals for CSI measurement for each of the one or more associated subframes, for each unlicensed subcarrier of the associated subset of the set of unlicensed carriers; for each DL transmission of the plurality of DL transmissions, scale the set of reference signals measured for each of the one or more associated subframes of that DL transmission based on the associated Tx power indicated by that DL transmission to obtain a scaled set of reference signals for that subframe; determine an associated CQI for one or more subcarriers of the set of unlicensed subcarriers, wherein each associated CQI is based on at least one scaled set of reference signals for that unlicensed subcarrier for two or more DL transmissions of the plurality of DL transmissions; and generate a CSI report that indicates the associated CQI for each of the one or more subcarriers. The means for storing is configured to store one or more of data or instructions, wherein the one or more of data or instructions are associated with the means for processing.

Example 48 comprises the subject matter of any variation of example 47, wherein the reference signals for CSI measurement comprise a set of cell-specific reference signals (CRS).

Example 49 comprises the subject matter of any variation of example 47, wherein the reference signals for CSI measurement comprise a set of CSI reference signals (CSI-RS).

Example 50 comprises the subject matter of any variation of any of examples 47-49, wherein the CSI report is a periodic CSI report, and wherein the CSI report is generated based at least in part on encoding the CSI report for a physical uplink control channel (PUCCH).

Example 51 comprises the subject matter of any variation of any of examples 47-49, wherein the CSI report is an aperiodic CSI report, and wherein the CSI report is generated based at least in part on modulating the CSI report for a physical uplink shared channel (PUSCH).

Example 52 may include a method for transmission of reference signals for a wireless communication system comprising an eNB capable of performing listen-before-talk (LBT) with extended clear channel assessment (CCA) mechanism, wherein the eNB can sense the channel to determine if the channel is busy or idle, and transmit after a random duration specified within a given interval.

Example 53 may include the method of example 52 or some other example herein, wherein CRS can be transmitted within each subframe of a DL burst.

Example 54 may include the method of example 52 or some other example herein, wherein CRS can be transmitted within a DRS burst.

Example 55 may include the method of example 52 or some other example herein, wherein antenna ports used for CRS within DRS can be different from the antenna ports used for CRS transmission within DL burst.

Example 56 may include the method of example 52 or some other example herein, wherein antenna ports used for CRS within DRS can be the same as the antenna ports used for CRS transmission within DL burst.

Example 57 may include the method of example 52 or some other example herein, wherein CSI-RS can be transmitted within each subframe of a DL burst.

Example 58 may include the method of example 52 or some other example herein, wherein CSI-RS can be transmitted within a DRS burst.

Example 59 may include the method of example 52 or some other example herein, wherein antenna ports used for CSI-RS within DRS can be different from the antenna ports used for CSI-RS transmission within DL burst.

Example 60 may include the method of example 52 or some other example herein, wherein antenna ports used for CSI-RS within DRS can be the same as the antenna ports used for CSI-RS transmission within DL burst.

Example 61 may include the method of example 52 or some other example herein, wherein if a UE is configured with DRS and CSI-RS in the same subframe, only CSI-RS configured for CSI measurements is transmitted Example 62 may include the method of example 52 or some other example herein, wherein if a UE is configured with DRS and CSI-RS in the same subframe, only CSI-RS configured for DRS is transmitted Example 63 may include the method of example 52 or some other example herein, wherein if a UE is configured with DRS and CSI-RS in the same subframe, both CSI-RS configured for CSI-RS and DRS can be transmitted.

Example 64 may include a method for the transmission of CSI reports for a wireless communication system comprising an eNB capable of performing listen-before-talk (LBT) with extended clear channel assessment (CCA) mechanism, wherein the eNB can sense the channel to determine if the channel is busy or idle, and transmit after a random duration specified within a given interval.

Example 65 may include the method of example 64 or some other example herein, wherein if the CRS/CSI-RS power is not explicitly indicated to a UE, the UE should only use the subframes within the same DL burst to compute the CSI computation; and for the purposes of CSI reporting, UE may report the latest CSI computation based on the subframes received within the latest burst until the transmission instant of the CSI report.

Example 66 may include the method of example 64 or some other example herein, wherein, if the CRS/CSI-RS power is explicitly indicated to a UE, the UE is required to appropriately scale the CSI. As one of the embodiments, the UE may scale the computed CSI by taking into account different transmit power over DL bursts to obtain an equivalent CSI. After computing the equivalent CSI, it is up to UE to select the set of subframes to be used for equivalent CSI computation and averaging.

Example 67 may include the method of example 64 or some other example herein, wherein for aperiodic report, it is possible to explicitly indicate the subframe used for CSI computing. In one of the embodiments, UL grant can be sent on the SCell along with the CSI-RS within the same subframe and the UE only uses the indicated subframe for the purposes of CSI reporting over which the UL grant for CSI report is transmitted.

Example 68 may include the method of example 64 or some other example herein, wherein if a UE is configured with multiple component carriers, the UE may indicate the latest computed CSI for the SCell over which the UL grant for the CSI request is not transmitted.

Example 69 may include the method of example 64 or some other example herein, wherein if a UE is configured with multiple component carriers, independent CSI process for each component carrier is configured to resolve the issue that simultaneous CSI-RS transmission may not be possible across the component carriers.

Example 70 may include an apparatus comprising means to perform one or more elements of a method described in or related to any of examples 1-69, or any other method or process described herein.

Example 71 may include one or more non-transitory computer-readable media comprising instructions to cause an electronic device, upon execution of the instructions by one or more processors of the electronic device, to perform one or more elements of a method described in or related to any of examples 1-69, or any other method or process described herein.

Example 72 may include an apparatus comprising logic, modules, and/or circuitry to perform one or more elements of a method described in or related to any of examples 1-69, or any other method or process described herein.

Example 73 may include a method, technique, or process as described in or related to any of examples 1-69, or portions or parts thereof.

Example 74 may include an apparatus comprising: one or more processors and one or more computer readable media comprising instructions that, when executed by the one or more processors, cause the one or more processors to perform the method, techniques, or process as described in or related to any of examples 1-69, or portions thereof.

Example 75 may include a method of communicating in a wireless network as shown and described herein.

Example 76 may include a system for providing wireless communication as shown and described herein.

Example 77 may include a device for providing wireless communication as shown and described herein.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is function-ally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A user equipment (UE), comprising:
a memory storing instructions; and
a processor coupled to the memory and, when executing the instructions, configured to:
measure channel state information reference signals (CSI-RS) of one or more subframes of a secondary cell (Scell);
compute a channel quality indicator (CQI) based on the CSI-RS by averaging CSI-RS measurements of a first subframe and a second subframe separated from the first subframe by at least one intervening sub-frame when all orthogonal frequency division mul-tiplexing (OFDM) symbols of the first subframe through the second subframe are occupied;
compute the CQI without averaging the CSI-RS mea-surements of the first subframe and the second subframe when any of the OFDM symbols of the first subframe through the second subframe are not occupied; and
generate a CSI report that indicates the CQI.

2. The UE of claim 1, wherein computing the CQI without averaging the CSI-RS measurements of the first subframe and the second subframe is based on a CSI-RS measurement of a single subframe from the first subframe through the second subframe.

3. The UE of claim 1, wherein the CSI report comprises CSI parameters, and the CSI parameters comprise the CQI, a precoding matrix indicator (PMI), a precoding type indi-cator (PTI), and a rank indication (RI).

4. The UE of claim 1, wherein the CSI report is a periodic CSI report encoded for a physical uplink control channel (PUCCH).

5. The UE of claim 1, wherein the CSI report is an aperiodic CSI report modulated for a physical uplink shared channel (PUSCH) according to one of:
a Quadrature Phase Shift Keying (QPSK) modulation scheme,
a 16 Quadrature Amplitude Modulation (QAM) modula-tion scheme, or
a 64QAM modulation scheme.

6. The UE of claim 1, wherein:
each subframe of the first subframe through the second subframe comprises a set of CSI-RS scheduled in that subframe; and a distinct set of measurements associated with that sub-frame is taken based on the set of CSI-RS scheduled in that subframe.

7. The UE of claim 1, wherein the CSI-RS comprise non-zero power (NZP) CSI-RS.

8. A User Equipment (UE), comprising:
a memory storing instructions; and
a processor coupled to the memory and, when executing the instructions, configured to:
measure cell-specific reference signals (CRS) of one or more subframes of a secondary cell (Scell);
compute a channel quality indicator (CQI) based on the CRS by averaging CRS measurements of a first subframe and a second subframe separated from the first subframe by at least one intervening subframe when all orthogonal frequency division multiplexing (OFDM) symbols of a second slot of the first sub-frame, a first three OFDM symbols of the second subframe, and all OFDM symbols of each subframe of the at least one intervening subframe are occu-pied;
compute the CQI based on the CRS without averaging the CRS measurements of the first subframe and the second subframe when:
any OFDM symbol of the second slot of the first subframe is not occupied,
any OFDM symbol of any subframe of the at least one intervening subframe is not occupied, or
any of the first three OFDM symbols of the second subframe is not occupied; and
generate a CSI report that indicates the CQI.

9. The UE of claim 8, wherein computing the CQI based on the CRS without averaging the CRS measurements of the first subframe and the second subframe is based on a CRS measurement of a single subframe from the first subframe through the second subframe.

10. The UE of claim 8, wherein the CSI report comprises CSI parameters, and the CSI parameters comprise the CQI, a precoding matrix indicator (PMI), a precoding type indi-cator (PTI), and a rank indication (RI).

11. The UE of claim 8, wherein the CSI report is a periodic CSI report encoded for a physical uplink control channel (PUCCH).

12. The UE of claim 8, wherein the CSI report is an aperiodic CSI report modulated for a physical uplink shared channel (PUSCH) according to one of:
a Quadrature Phase Shift Keying (QPSK) modulation scheme,
a 16 Quadrature Amplitude Modulation (QAM) modula-tion scheme, or
a 64QAM modulation scheme.

13. The UE of claim 8, wherein the CQI is also based at least in part on one or more interference measurements of an unlicensed subcarrier in connection with resource elements (REs) indicated via an interference measurement configu-ration.

14. The UE of claim 8, wherein:
each subframe of the first subframe through the second subframe comprises a set of CRS scheduled in that subframe; and
a distinct set of measurements associated with that sub-frame is taken based on the set of CRS scheduled in that subframe.

15. A method performed by a User Equipment (UE), the method comprising:

measuring channel state information reference signals (CSI-RS) of one or more subframes of a secondary cell (Scell);

computing a channel quality indicator (CQI) based on the CSI-RS by averaging CSI-RS measurements of a first subframe and a second subframe separated from the first subframe by at least one intervening subframe when all orthogonal frequency division multiplexing (OFDM) symbols of the first subframe through the second subframe are occupied;

computing the CQI without averaging the CSI-RS measurements of the first subframe and the second subframe when any of the OFDM symbols of the first subframe through the second subframe are not occupied; and generating a CSI report that indicates the CQI.

16. The method of claim 15, wherein computing the CQI based on the CSI-RS without averaging the CSI-RS measurements of the first subframe and the second subframe is based on a CSI-RS measurement of a single subframe from the first subframe through the second subframe.

17. The method of claim 15, wherein the CSI report comprises CSI parameters, and the CSI parameters comprise the CQI, a precoding matrix indicator (PMI), a precoding type indicator (PTI), and a rank indication (RI).

18. The method of claim 15, wherein the CSI report is a periodic CSI report encoded for a physical uplink control channel (PUCCH).

19. The method of claim 15, wherein the CSI report is an aperiodic CSI report modulated for a physical uplink shared channel (PUSCH) according to one of:

a Quadrature Phase Shift Keying (QPSK) modulation scheme, a 16 Quadrature Amplitude Modulation (QAM) modulation scheme, or a 64QAM modulation scheme.

20. The method of claim 15, wherein:

each subframe of the first subframe through the second subframe comprises a set of CSI-RS scheduled in that subframe; and a distinct set of measurements associated with that subframe is taken based on the set of CSI-RS scheduled in that subframe.

* * * * *